(12) United States Patent
Bothor et al.

(10) Patent No.: US 12,115,763 B2
(45) Date of Patent: Oct. 15, 2024

(54) SHEETLIKE COMPOSITE, ESPECIALLY FOR PRODUCTION OF DIMENSIONALLY STABLE FOOD OR DRINK PRODUCT CONTAINERS, COMPRISING A POLYMER LAYER P HAVING AN L VALUE

(71) Applicant: SIG Services AG, Neuhausen am Rheinfall (CH)

(72) Inventors: Roland Bothor, Aachen (DE); Markus Raue, Aachen (DE)

(73) Assignee: SIG Services AG, Neuhausen am Rheinfall (CH)

( * ) Notice: Subject to any disclaimer, the term of this patent is extended or adjusted under 35 U.S.C. 154(b) by 0 days.

(21) Appl. No.: 16/630,945

(22) PCT Filed: Jul. 12, 2018

(86) PCT No.: PCT/EP2018/069024
§ 371 (c)(1),
(2) Date: Jan. 14, 2020

(87) PCT Pub. No.: WO2019/020399
PCT Pub. Date: Jan. 31, 2019

(65) Prior Publication Data
US 2020/0223199 A1    Jul. 16, 2020

(30) Foreign Application Priority Data
Jul. 14, 2017    (DE) .................... 102017212142.4

(51) Int. Cl.
*B32B 27/32*    (2006.01)
*B32B 3/26*    (2006.01)
(Continued)

(52) U.S. Cl.
CPC .............. *B32B 27/32* (2013.01); *B32B 3/266* (2013.01); *B32B 7/12* (2013.01); *B65D 85/72* (2013.01);
(Continued)

(58) Field of Classification Search
CPC ................ B32B 27/32; B32B 2307/71; B32B 2264/108; B32B 2264/102; B32B 3/266
See application file for complete search history.

(56) References Cited

U.S. PATENT DOCUMENTS 3,547,746 A    12/1970  Gwinner
5,261,899 A *  11/1993  Visscher ............. A61F 13/8405
                                                    604/367
(Continued)

FOREIGN PATENT DOCUMENTS

CN    102844174 A    12/2012
CN    103702830 A    4/2014
(Continued)

OTHER PUBLICATIONS

Chinese Office Action; The State Intellectual Property Office of the People's Republic of China; Chinese Application No. 201810771337.0; Jan. 17, 2020; 2 pages.
(Continued)

*Primary Examiner* — Michael C Miggins
(74) *Attorney, Agent, or Firm* — Taft Stettinius & Hollister LLP

(57) ABSTRACT

The invention relates to a sheetlike composite comprising, as mutually superposed layers in a direction from an outer face of the sheetlike composite to an inner face of the sheetlike composite, a) a carrier layer, and b) a barrier layer; wherein the sheetlike composite additionally includes a polymer layer P comprising a first polymer; wherein the polymer layer P has an L value in the L*a*b* colour space
(Continued)

Figure 1:
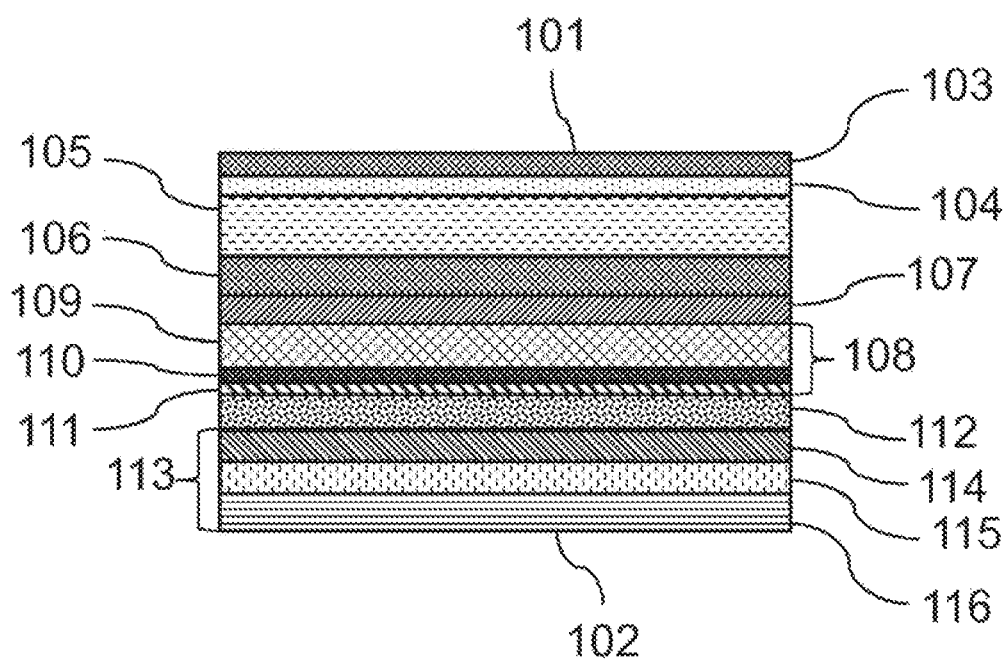

within a range from 30 to 56. The invention further relates to methods of producing a sheetlike composite, a container precursor and a closed container and to the aforementioned method products; to a container precursor and a closed container each including at least one sheetlike region of the sheetlike composite; to uses of the sheetlike composite for production of a food or drink product container and in a microwave oven; and to uses of compositions for production of a sheetlike composite for a food or drink product container.

9 Claims, 6 Drawing Sheets

(51) Int. Cl.
*B32B 7/12* (2006.01)
*B65D 85/72* (2006.01)

(52) U.S. Cl.
CPC ... *B32B 2264/102* (2013.01); *B32B 2264/108* (2013.01); *B32B 2307/71* (2013.01); *B32B 2439/40* (2013.01)

(56) References Cited

U.S. PATENT DOCUMENTS

| | | |
|---|---|---|
| 6,406,782 B2 | 6/2002 | Johnson et al. |
| 8,505,760 B2 | 8/2013 | Ott |
| 2011/0043901 A1 | 2/2011 | Watanabe et al. |
| 2011/0247683 A1 | 10/2011 | Watanabe et al. |
| 2014/0044904 A1 | 2/2014 | De Belder et al. |
| 2017/0157885 A1 | 6/2017 | Ochsmann et al. |

FOREIGN PATENT DOCUMENTS

| | | |
|---|---|---|
| CN | 106458358 A | 2/2017 |
| CN | 106459665 A | 2/2017 |
| DE | 69829863 T2 | 1/2006 |
| EP | 1089877 B1 | 11/2004 |
| EP | 1812298 B1 | 9/2009 |
| EP | 2528732 B1 | 12/2019 |
| JP | H07137206 A | 5/1995 |
| JP | 2000199939 A | 7/2000 |
| JP | 2002029004 A | 1/2002 |
| JP | 2003530254 A | 10/2003 |
| JP | 2003341731 A | 12/2003 |
| JP | 2009030186 A | 2/2009 |
| JP | 2009062095 A | 3/2009 |
| JP | 2011250699 A | 12/2011 |
| JP | 2014136405 A | 7/2014 |
| WO | 9009926 A2 | 9/1990 |
| WO | 2014023393 A1 | 2/2014 |
| WO | WO2014023393 * | 2/2014 |
| WO | 2015131167 A1 | 9/2015 |

OTHER PUBLICATIONS

Examination Report; Patent Office at the Secretariat General for Cooperation Council; Gulf Cooperation Council Application No. GC 2018-35616; Apr. 6, 2021; 7 pages.

International Search Report; European Patent Office; International Application No. PCT/EP2018/069024; Nov. 22, 2018; 7 pages.

Written Opinion of the International Searching Authority; European Patent Office; International Application No. PCT/EP2018/069024; Nov. 22, 2018; 10 pages.

Office Action; Japanese Patent Office; Japanese Application No. 2020-501338; Apr. 1, 2022; 10 pages.

* cited by examiner

100

200

400

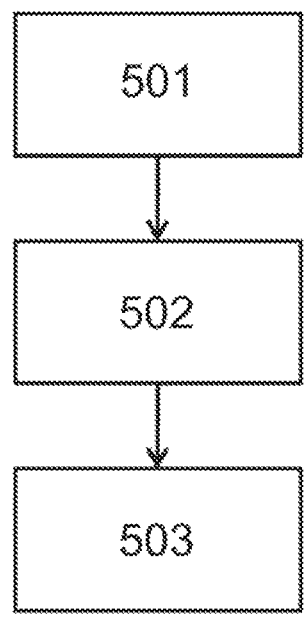

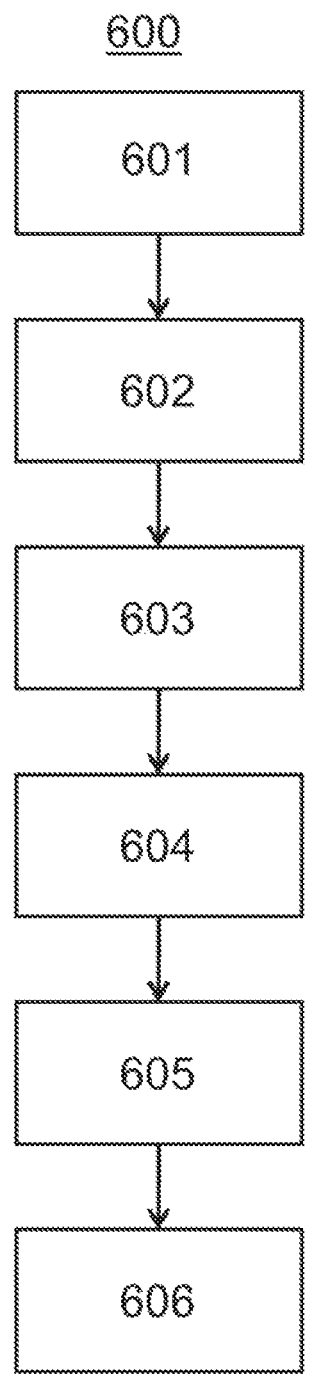

SHEETLIKE COMPOSITE, ESPECIALLY FOR PRODUCTION OF DIMENSIONALLY STABLE FOOD OR DRINK PRODUCT CONTAINERS, COMPRISING A POLYMER LAYER P HAVING AN L VALUE

CROSS-REFERENCE TO RELATED APPLICATIONS

This application is a U.S. National Phase of International PCT Application No. PCT/EP2018/069024 filed Jul. 12, 2018, which claims priority to German Patent Application Ser. No. 10 2017 212 142.4 filed Jul. 14, 2017, the contents of each application are incorporated herein by reference in their entirety.

The present invention relates to a sheetlike composite comprising, as mutually superposed layers in a direction from an outer face of the sheetlike composite to an inner face of the sheetlike composite,
  a) a carrier layer, and
  b) a barrier layer;
wherein the sheetlike composite additionally includes a polymer layer P comprising a first polymer; wherein the polymer layer P has an L value in the L*a*b* colour space within a range from 30 to 56. The invention further relates to methods of producing a sheetlike composite, a container precursor and a closed container and to the aforementioned method products; to a container precursor and a closed container each including at least one sheetlike region of the sheetlike composite; to uses of the sheetlike composite for production of a food or drink product container and in a microwave oven; and to uses of compositions for production of a sheetlike composite for a food or drink product container.

For some time, food and drink products, whether they be food and drink products for human consumption or else animal feed products, have been preserved by storing them either in a can or in a jar closed by a lid. In this case, the shelf life can be increased firstly by sterilizing the food or drink product and the container, here the jar or can, separately and to the greatest possible extent in each case, and then introducing the food or drink product into the container and closing the container. However, these measures for increasing the shelf life of food and drink products, which have been tried and tested over a long period, have a series of disadvantages, for example the need for another sterilization later on. Cans and jars, because of their essentially cylindrical shape, have the disadvantage that very dense and space-saving storage is not possible. Moreover, cans and jars have considerable intrinsic weight, which leads to increased energy expenditure in transport. In addition, production of glass, tinplate or aluminium, even when the raw materials used for this purpose are recycled, necessitates quite a high expenditure of energy. In the case of jars, an additional aggravating factor is elevated expenditure on transport. The jars are usually prefabricated in a glass factory and then have to be transported to the facility where the food and drink products are dispensed with the use of considerable transport volumes. Furthermore, jars and cans can be opened only with considerable expenditure of force or with the aid of tools and hence in a rather laborious manner. In the case of cans, there is a high risk of injury arising from sharp edges that occur on opening. In the case of jars, there are recurrent instances of broken glass getting into the food or drink product in the course of filling or opening of the filled jars, which in the worst case can lead to internal injuries when the food or drink product is consumed. In addition, both cans and jars have to be labelled for identification and promotion of the food or drink product contents. The jars and cans cannot readily be printed directly with information and promotional messages. In addition to the actual print, a substrate for the print, a paper or a suitable film, is thus needed, as is a securing means, i. e. an adhesive or a sealant.

Other packaging systems for storing food and drink products over a long period with minimum impairment are known from the prior art. These are containers produced from sheetlike composites—frequently also referred to as laminates. Sheetlike composites of this kind are frequently constructed from a thermoplastic polymer layer, a carrier layer usually consisting of cardboard or paper which imparts dimensional stability to the container, an adhesion promoter layer, a barrier layer and a further polymer layer, as disclosed inter alia in WO 90/09926 A2. Since the carrier layer imparts dimensional stability to the container manufactured from the laminate, these containers, by contrast with film bags, can be regarded as a further development of the aforementioned jars and cans.

At the same time, these laminate containers already have many advantages over the conventional jars and cans. Nevertheless, there are opportunities for improvement in the case of these packaging systems too. For instance, the barrier layer in the prior art typically consists of an aluminium foil having a thickness of several μm. Aluminium is a material which is comparatively energy- and resource-intensive to produce. Moreover, the aluminium foil makes it difficult to recycle the laminate after the use of the prior art container. Thus, there has for some time been a need, for reasons of environmental protection, for a laminate suitable for production of food and drink product containers which has a minimum amount of metal, especially a minimum amount of aluminium. Moreover, there has long been a need for microwaveable food and drink product containers. For this reason too, there is a need for a laminate suitable for production of food and drink product containers which has a minimum amount of metal, especially a minimum amount of aluminium. It is particularly desirable here to overcome the aforementioned disadvantages if at all possible without having to accept adverse effects on the shelf life of food or drink products stored in the containers or on the integrity of the containers. The prior art discloses laminates having an aluminium-free barrier layer. However, containers made from these laminates frequently have inadequate shelf life for particular food and drink products, such as milk in particular.

In general terms, it is an object of the present invention to at least partly overcome a disadvantage that arises from the prior art. It is a further object of the invention to provide a laminate of maximum environmental compatibility from which it is possible to produce a dimensionally stable food or drink product container for storing a food or drink product with maximum shelf life, especially for milk. At the same time, the food or drink product, during its shelf life, preferably experiences minimum impairment of its taste. It is a further object of the invention to provide a laminate from which it is possible to produce a dimensionally stable food or drink product container for storing a food or drink product with maximum shelf life, especially for milk, and which is suitable for use in a microwave oven. It is an additional or alternative object of the invention to provide a laminate for production of a dimensionally stable food or drink product container having as good as possible opening characteristics. In this context, the container can preferably be opened in an as simple as possible manner or in an as clean as possible manner or both. Especially preferably, the container can be opened easily with just a drinking straw as opening aid. It is an additional or alternative object of the invention to provide a laminate for production of a dimensionally stable food or drink product container having particularly good processing properties in the production of the food or drink product container. It is a further object of the invention to provide a laminate for production of a dimensionally stable food or drink product containers having one or more of the aforementioned advantages, where the container features minimum transport weight with the same contents. It is a further object of the invention to provide a dimensionally stable food or drink product container made from the aforementioned advantageous laminate. It is a further object of the invention to provide a method of producing a dimensionally stable food or drink product container from the aforementioned advantageous laminate.

A contribution to the at least partial achievement of at least one, preferably more than one, of the above objects is made by the independent claims. The dependent claims provide preferred embodiments which contribute to the at least partial achievement of at least one of the objects.

A contribution to the achievement of at least one of the objects of the invention is made by an embodiment 1 of a sheetlike composite 1 comprising, as mutually superposed layers, in a direction from an outer face of the sheetlike composite to an inner face of the sheetlike composite, a) a carrier layer, and
b) a barrier layer;

wherein the sheetlike composite additionally includes a polymer layer P comprising a first polymer; wherein the polymer layer P has an L value in the L*a*b* colour space within a range from 30 to 56, preferably from 32 to 54, more preferably from 32 to 52, more preferably from 34 to 52, more preferably from 34 to 50, even more preferably from 36 to 50, most preferably from 36 to 48.

In one embodiment 2 according to the invention, the sheetlike composite 1 is configured according to the embodiment 1, wherein the polymer layer P additionally includes
a. a first type of inorganic particles, and
b. a further type of inorganic particles.

In one embodiment 3 according to the invention, the sheetlike composite 1 is configured according to the embodiment 1 or 2, wherein the polymer layer P has an average thickness within a range from 10 to 40 μm, preferably from 10 to 35 μm, more preferably from 10 to 30 μm, most preferably from 15 to 30 μm.

In one embodiment 4 according to the invention, the sheetlike composite 1 is configured according to either of embodiments 2 and 3, wherein the inorganic particles of the first type comprise a titanium oxide. A preferred titanium oxide is $TiO_2$. Preferably, the inorganic particles of the first type consist of the titanium oxide.

In one embodiment 5 according to the invention, the sheetlike composite 1 is configured according to embodiment 4, wherein the polymer layer P comprises the titanium oxide at a proportion within a range from 5% to 30% by weight, preferably from 5% to 25% by weight, more preferably from 8% to 21% by weight, more preferably from 10% to 18% by weight, more preferably from 12% to 18% by weight, even more preferably from 14% to 18% by weight, most preferably from 14% to 16% by weight, based in each case on the weight of the polymer layer P.

In one embodiment 6 according to the invention, the sheetlike composite 1 is configured according to any of its embodiment 2 to 5, wherein the polymer layer P comprises the inorganic particles of the first type at a proportion within a range from 5% to 30% by weight, preferably from 5% to 25% by weight, more preferably from 8% to 21% by weight, more preferably from 10% to 18% by weight, more preferably from 12% to 18% by weight, even more preferably from 14% to 18% by weight, most preferably from 14% to 16% by weight, based in each case on the weight of the polymer layer P.

In one embodiment 7 according to the invention, the sheetlike composite 1 is configured according to any of its embodiments 2 to 6, wherein the inorganic particles of the further type include elemental carbon.

In one embodiment 8 according to the invention, the sheetlike composite 1 is configured according to any of its embodiments 2 to 7, wherein the inorganic particles of the further type are carbon black particles.

In one embodiment 9 according to the invention, the sheetlike composite 1 is configured according to any of its preceding embodiments, wherein the polymer layer P has an average transmittance for light within a wavelength range from 410 to 475 nm within a range from 0.01% to 0.45%, preferably from 0.05% to 0.40%, more preferably from 0.05% to 0.35%.

In one embodiment 10 according to the invention, the sheetlike composite 1 is configured according to any of its preceding embodiments, wherein the polymer layer P has an average transmittance for light within a wavelength range from 475 to 480 nm within a range from 0.01% to 0.45%, preferably from 0.05% to 0.40%, more preferably from 0.05% to 0.35%.

In one embodiment 11 according to the invention, the sheetlike composite 1 is configured according to any of its preceding embodiments, wherein the first polymer is a thermoplastic polymer.

In one embodiment 12 according to the invention, the sheetlike composite 1 is configured according to any of its preceding embodiments, wherein the first polymer is a polyolefin.

In one embodiment 13 according to the invention, the sheetlike composite 1 is configured according to any of its preceding embodiments 12, wherein the polyolefin is a polyethylene or a polypropylene or both. In this context, a preferred polyethylene is an LDPE.

In one embodiment 14 according to the invention, the sheetlike composite 1 is configured according to any of its preceding embodiments, wherein the polymer layer P comprises the first polymer at a proportion within a range from 30% to 94.5% by weight, preferably from 40% to 94.5%, more preferably from 50% to 94.5% by weight, more preferably from 60% to 94.5% by weight, more preferably from 70% to 94.5% by weight, more preferably from 80% to 94.5% by weight, more preferably from 80% to 90% by weight, more preferably from 82% to 90% by weight, more preferably from 82% to 88% by weight, most preferably from 82% to 85% by weight, based in each case on the weight of the polymer layer P. Preferably, the polymer layer P comprises the inorganic particles of the first type at a first proportion in % by weight, the inorganic particles of the further type at a further proportion in % by weight, and the first polymer at a proportion of (100% by weight-first proportion-further proportion) in % by weight, the percentages by weight each being based on the weight of the polymer layer P.

In one embodiment 15 according to the invention, the sheetlike composite 1 is configured according to any of its preceding embodiments, wherein the barrier layer on a side facing the carrier layer consists of a different material from that of a side facing away from the carrier layer.

In one embodiment 16 according to the invention, the sheetlike composite 1 is configured according to any of its preceding embodiments, wherein the carrier layer has a transmittance for light within a wavelength range from 475 to 480 nm of at least 0.4%, preferably within a range from 0.4% to 5%, more preferably from 0.4% to 4%, even more preferably from 0.5% to 3.5%.

In one embodiment 17 according to the invention, the sheetlike composite 1 is configured according to any of its preceding embodiments, wherein the carrier layer is characterized by a basis weight within a range from 140 to 400 g/m², preferably from 150 to 350 g/m², more preferably from 160 to 330 g/m², even more preferably from 160 to 300 g/m², even more preferably from 160 to 250 g/m², most preferably from 160 to 240 g/m².

In one embodiment 18 according to the invention, the sheetlike composite 1 is configured according to any of its preceding embodiments, wherein the carrier layer has at least one hole, wherein the at least one hole is covered at least by the polymer layer P as hole-covering layer.

In one embodiment 19 according to the invention, the sheetlike composite 1 is configured according to its embodiment 18, wherein the at least one hole is additionally covered at least by the barrier layer as a further hole-covering layer. Preferably, the at least one hole is further covered by a layer selected from the group consisting of the inner polymer layer, the outer polymer layer and the polymer interlayer, or by a combination of at least two of these. Layers covering the at least one hole are referred to herein as hole-covering layers. If at least 2 hole-covering layers are present, the hole-covering layers in the hole preferably form a layer sequence of layers joined to one another in the at least one hole.

In one embodiment 20 according to the invention, the sheetlike composite 1 is configured according to any of its preceding embodiments, wherein the polymer layer P is disposed between the carrier layer and the barrier layer. In this connection, the polymer layer P is also referred to herein as polymer interlayer.

In one embodiment 21 according to the invention, the sheetlike composite 1 is configured according to any of its preceding embodiments, wherein the barrier layer includes, as mutually superposed sublayers,
  a. a barrier substrate layer, and
  b. a barrier material layer;
wherein the barrier material layer has an average thickness within a range from 1 nm to 1 µm, preferably from 1 to 500 nm, more preferably from 1 to 300 nm, most preferably from 1 to 100 nm. Preferably, the barrier substrate layer has an average thickness within a range from 2 to 35 µm, preferably from 3 to 30 µm, more preferably from 4 to 25 µm, more preferably from 5 to 20 µm, most preferably from 8 to 15 µm.

In one embodiment 22 according to the invention, the sheetlike composite 1 is configured according to its embodiment 21, wherein the barrier material layer overlays the barrier substrate layer on a side of the barrier substrate layer facing the inner face.

In one embodiment 23 according to the invention, the sheetlike composite 1 is configured according to its embodiment 21 or 22, wherein the barrier layer additionally comprises a protective layer as a further sublayer, wherein the protective layer overlays the barrier material layer on a side of the barrier material layer remote from the barrier substrate layer. A useful protective layer is any layer that seems suitable to the person skilled in the art for the use according to the invention, especially for protection of the barrier material layer from mechanical influences such as the influence of a tool on the sheetlike composite. Preferably, the protective layer is plastically deformable at a temperature of 20° C. Additionally or alternatively, the protective layer preferably has a thickness within a range from 1 to 50 µm, preferably from 1 to 30 µm, more preferably from 1 to 30 µm. Additionally or alternatively to the aforementioned preferred properties, the protective layer preferably includes a polyvinyl alcohol (PVOH) or a siloxane compound or both. In this connection, the siloxane compound preferably has an empirical formula of the $Si(OR)_4$ form where R is an organic moiety.

In one embodiment 24 according to the invention, the sheetlike composite 1 is configured according to its embodiment 23, wherein the protective layer adjoins the barrier material layer.

In one embodiment 25 according to the invention, the sheetlike composite 1 is configured according to any of its preceding embodiments, wherein the barrier layer has an average thickness within a range from 2 to 35 µm, preferably from 5 to 30 µm, more preferably from 5 to 25 µm, most preferably from 5 to 20 µm.

In one embodiment 26 according to the invention, the sheetlike composite 1 is configured according to any of its its embodiments 21 to 25, wherein the barrier substrate layer adjoins the barrier material layer. Preferably, the barrier layer consists of the barrier substrate layer and the barrier material layer, or of the barrier substrate layer, the barrier material layer and the protective layer. Preferably, the barrier substrate layer is joined directly to the barrier material layer, preferably by intermolecular bonds or covalent bonds or both.

In one embodiment 27 according to the invention, the sheetlike composite 1 is configured according to any of its preceding embodiments, wherein the barrier layer has an oxygen permeation rate within a range from 0.1 to 40 cm³/(m²·day·atm), preferably from 0.1 to 20 cm³/(m²·day·atm), more preferably from 0.1 to 10 cm³/(m²·day·atm), more preferably from 0.1 to 5 cm³/(m²·day·atm), more preferably from 0.1 to 3 cm³/(m²·day·atm), more preferably from 0.1 to 2 cm³/(m²·day·atm), most preferably from 0.1 to 1 cm³/(m²·day·atm).

In one embodiment 28 according to the invention, the sheetlike composite 1 is configured according to any of its preceding embodiments, wherein the barrier layer has a water vapour permeation rate within a range from 0.1 to 40 g/(m²·day), preferably from 0.1 to 20 g/(m²·day), more preferably from 0.1 to 10 g/(m²·day), more preferably from 0.1 to 5 g/(m²·day), more preferably from 0.1 to 3 g/(m²·day), more preferably from 0.1 to 2 g/(m²·day), most preferably from 0.1 to 1 g/(m²·day).

In one embodiment 29 according to the invention, the sheetlike composite 1 is configured according to any of its preceding embodiments, wherein the barrier layer has at least one of, preferably two of, more preferably all of, the following features:
  A. a tensile strength within a range from 100 to 160 MPa, preferably from 110 to 150 MPa, more preferably from 120 to 145 MPa, most preferably from 125 to 140 MPa,
  A. a tensile elongation within a range from 80% to 130%, preferably from 85% to 125%, more preferably from 90% to 120%, most preferably from 90% to 115%,
  C. a modulus of elasticity within a range from 4000 to 5500 MPa, preferably from 4100 to 5300 MPa, more preferably from 4100 to 5100 MPa, more preferably from 4100 to 5000 MPa, more preferably from 4100 to 4900 MPa, more preferably from 4200 to 4800 MPa, most preferably from 4300 to 4750 MPa.

The above properties are each applicable preferably in a direction of extension of the barrier layer in a layer plane of the barrier layer. The layer plane here is preferably the plane in which the barrier layer extends in sheetlike. A preferential direction of extension is a machine direction (MD) or a direction which is perpendicular to the machine direction in the layer plane of the barrier layer. In this context, the machine direction is preferably a direction of a first stretching operation on at least one sublayer of the barrier layer. The direction which is perpendicular to the machine direction is preferably a direction of a further stretching operation on at least one sublayer of the barrier layer. The sublayer here is preferably the barrier substrate layer.

In one embodiment 30 according to the invention, the sheetlike composite 1 is configured according to any of its embodiments 21 to 29, wherein the barrier substrate layer comprises a second polymer in a proportion of at least 50% by weight, preferably of at least 60% by weight, more preferably of at least 70% by weight, more preferably of at least 80% by weight, most preferably of at least 90% by weight, based in each case on the weight of the barrier substrate layer. A preferred second polymer here is an oriented polymer. The oriented polymer has preferably been monoaxially oriented or biaxially oriented. In addition, a preferred second polymer is a thermoplastic polymer. Preferably, the barrier substrate layer consists of the second polymer.

In one embodiment 31 according to the invention, the sheetlike composite 1 is configured according to its embodiment 30, wherein the second polymer is selected from the group consisting of a polycondensate, a polyethylene, a polypropylene, a polyvinyl alcohol, or a combination of at least two of these. A preferred polypropylene has been oriented, especially longitudinally stretched (oPP) or biaxially stretched (BoPP). A preferred polycondensate is a polyester or polyamide (PA) or both. A preferred polyester is one selected from the group consisting of a polyethylene terephthalate (PET), a polylactide (PLA) or a combination of at least two of these. A preferred polyvinyl alcohol is a vinyl alcohol copolymer. A preferred vinyl alcohol copolymer is an ethylene-vinyl alcohol copolymer.

In one embodiment 32 according to the invention, the sheetlike composite 1 is configured according to any of its embodiments 21 to 31, wherein the barrier material layer comprises a barrier material in a proportion of at least 50% by weight, preferably of at least 60% by weight, more preferably of at least 70% by weight, more preferably of at least 80% by weight, most preferably of at least 90% by weight, based in each case on the weight of the barrier material layer, wherein the barrier material is selected from the group consisting of an oxide, a metal, a silicon-containing compound and a third polymer, or a combination of at least two of these. A preferred oxide is an oxide of one selected from the group consisting of one or more metals, one or more semimetals and one or more nonmetals, or a combination of at least two of these, for example of $Al_2O_3$ and $SiO_2$. The preferred oxide of a metal is one selected from the group consisting of an aluminium oxide, for example $Al_2O_3$; a magnesium oxide, for example MgO; a titanium oxide, for example $TiO_2$; a tin oxide, for example an indium tin oxide (ITO), $Zn_2SnO_4$, SnO, $Sn_2O_3$ and $SnO_2$; a zinc oxide, for example ZnO; and an indium oxide, for example an indium tin oxide (ITO), InO, $In_2O_3$ and $InO_2$, or a combination of at least two of these. A preferred oxide of a semimetal is a silicon oxide, for example $SiO_2$. A preferred metal is aluminium. A preferred silicon-containing compound is a silicon nitride, for example $Si_3N_4$, or an organosilicon compound. A preferred organosilicon compound is a siloxane. A third polymer preferred as a barrier material is a vinyl polymer or a polyacrylic acid or both. A preferred vinyl polymer is a polyvinylidene chloride (PVdC) or a polyvinyl alcohol (PVOH) or both. Preferably, the barrier material layer consists of the barrier material.

In one embodiment 33 according to the invention, the sheetlike composite 1 is configured according to any of its preceding embodiments, wherein the barrier layer is characterized by an aluminium content of less than 50% by weight, preferably of less than 40% by weight, more preferably of less than 30% by weight, more preferably of less than 20% by weight, more preferably of less than 10% by weight, most preferably of less than 5% by weight, based in each case on the weight of the barrier layer. A preferred barrier layer does not contain any aluminium.

In one embodiment 34 according to the invention, the sheetlike composite 1 is configured according to any of its preceding embodiments, wherein the barrier layer is characterized by a metal content of less than 50% by weight, preferably of less than 40% by weight, more preferably of less than 30% by weight, more preferably of less than 20% by weight, more preferably of less than 10% by weight, most preferably of less than 5% by weight, based in each case on the weight of the barrier layer. A preferred barrier layer does not contain any metal.

In one embodiment 35 according to the invention, the sheetlike composite 1 is configured according to any of its preceding embodiments, wherein the sheetlike composite is characterized by an aluminium content of less than 10% by weight, more preferably of less than 8% by weight, most preferably of less than 5% by weight, based in each case on the weight of the sheetlike composite. A preferred sheetlike composite does not contain any aluminium.

In one embodiment 36 according to the invention, the sheetlike composite 1 is configured according to any of its preceding embodiments, wherein the sheetlike composite is characterized by a metal content of less than 10% by weight, more preferably of less than 8% by weight, most preferably of less than 5% by weight, based in each case on the weight of the sheetlike composite. A preferred sheetlike composite does not contain any metal.

In one embodiment 37 according to the invention, the sheetlike composite 1 is configured according to any of its preceding embodiments, wherein the sheetlike composite includes a first adhesion promoter layer between the carrier layer and the barrier layer. Preferably, the first adhesion promoter adjoins the barrier layer, more preferably the barrier substrate layer.

In one embodiment 38 according to the invention, the sheetlike composite 1 is configured according to any of its preceding embodiments, wherein the sheetlike composite includes a further adhesion promoter layer on a side of the barrier layer remote from the carrier layer. Preferably, the further adhesion promoter layer adjoins the barrier layer, preferably the barrier material layer or the protective layer, more preferably the protective layer.

In one embodiment 39 according to the invention, the sheetlike composite 1 is configured according to any of its preceding embodiments, wherein the sheetlike composite includes an outer polymer layer, wherein the outer polymer layer overlays the carrier layer on a side of the carrier layer remote from the barrier layer. In one embodiment, the sheetlike composite includes the polymer layer P as the outer polymer layer. In a further preferred embodiment, the sheetlike composite comprises the outer polymer layer in addition to the polymer layer P. In both cases, the outer polymer layer preferably includes a polyethylene or a polypropylene or both. Further preferably, the outer polymer layer includes the polyethylene or polypropylene or both together to an extent of at least 60% by weight, more preferably to an extent of at least 70% by weight, even more preferably to an extent of at least 80% by weight, most preferably to an extent of at least 90% by weight, based in each case on the weight of the outer polymer layer. A preferred polyethylene here is an LDPE. Accordingly, the outer polymer layer preferably includes an LDPE to an extent of at least 50% by weight, preferably to an extent of at least 60% by weight, more preferably to an extent of at least 70% by weight, still more preferably to an extent of at least 80% by weight, most preferably to an extent of at least 90% by weight, based in each case on the weight of the outer polymer layer. In one configuration of the sheetlike composite of the invention in which the outer polymer layer is the polymer layer P, the outer polymer layer may include any of the aforementioned polymers as the first polymer.

In one embodiment 40 according to the invention, the sheetlike composite 1 is configured according to any of its preceding embodiments, wherein the sheetlike composite includes an inner polymer layer, wherein the inner polymer layer overlays the barrier layer on a side of the barrier layer remote from the carrier layer. In one embodiment, the sheetlike composite includes the polymer layer P as the inner polymer layer. In a further preferred embodiment, the sheetlike composite comprises the inner polymer layer in addition to the polymer layer P. In both cases, the inner polymer layer preferably includes a polyethylene or a polypropylene or both. In this context, a particularly preferred polyethylene is an LDPE. Preferably, the inner polymer layer includes the polyethylene or the polypropylene or both together in a proportion of at least 30% by weight, more preferably at least 40% by weight, most preferably at least 50% by weight, based in each case on the total weight of the inner polymer layer. Additionally or alternatively, the inner polymer layer preferably includes an HDPE, preferably in a proportional at least 5% by weight, more preferably at least 10% by weight, more preferably at least 15% by weight, most preferably at least 20% by weight, based in each case on the total weight of the inner polymer layer. Additionally or alternatively to one or more of the aforementioned polymers, the inner polymer layer preferably includes a polymer prepared by means of a metallocene catalyst, preferably an mPE. Preferably, the inner polymer layer includes the mPE in a proportion of at least 3% by weight, more preferably at least 5% by weight, based in each case on the total weight of the inner polymer layer. In this case, the inner polymer layer may include 2 or more, preferably 2 or 3, of the aforementioned polymers in a polymer blend, for example at least a portion of the LDPE and the mPE, or at least a portion of the LDPE and the HDPE. In addition, the inner polymer layer may include 2 or more, preferably 3, mutually superposed sublayers which preferably form the inner polymer layer. The sublayers are preferably layers obtained by coextrusion.

In a preferred configuration of the sheetlike composite, the inner polymer layer includes, in a direction from the outer face of the sheetlike composite to the inner face of the sheetlike composite, a first sublayer including an LDPE in a proportion of at least 50% by weight, preferably of at least 60% by weight, more preferably of at least 70% by weight, even more preferably of at least 80% by weight, most preferably of at least 90% by weight, based in each case on the weight of the first sublayer, and a further sublayer including a blend, wherein the blend includes an LDPE in a proportion of at least 30% by weight, preferably of at least 40% by weight, more preferably of at least 50% by weight, even more preferably of at least 60% by weight, most preferably of at least 65% by weight, and an mPE in a proportion of at least 10% by weight, preferably of at least 15% by weight, more preferably of at least 20% by weight, most preferably of at least 25% by weight, based in each case on the weight of the blend. In this case, the further sublayer includes the blend preferably in a proportion of at least 50% by weight, preferably of at least 60% by weight, more preferably of at least 70% by weight, even more preferably of at least 80% by weight, most preferably of at least 90% by weight, based in each case on the weight of the further sublayer. More preferably, the further sublayer consists of the blend.

In a further preferred configuration of the sheetlike composite, the inner polymer layer includes, in a direction from the outer face of the sheetlike composite to the inner face of the sheetlike composite, a first sublayer including an HDPE in a proportion of at least 30% by weight, preferably of at least 40% by weight, more preferably of at least 50% by weight, even more preferably of at least 60% by weight, most preferably of at least 70% by weight, and an LDPE in a proportion of at least 10% by weight, preferably of at least 15% by weight, more preferably of at least 20% by weight, based in each case on the weight of the first sublayer; a second sublayer including an LDPE in a proportion of at least 50% by weight, preferably of at least 60% by weight, more preferably of at least 70% by weight, even more preferably of at least 80% by weight, most preferably of at least 90% by weight, based in each case on the weight of the second sublayer; and a third sublayer including a blend, wherein the blend includes an LDPE in a proportion of at least 30% by weight, preferably of at least 40% by weight, more preferably of at least 50% by weight, even more preferably of at least 60% by weight, most preferably of at least 65% by weight, and an mPE in a proportion of at least 10% by weight, preferably of at least 15% by weight, more preferably of at least 20% by weight, most preferably of at least 25% by weight, based in each case on the weight of the blend. In this case, the third sublayer includes the blend preferably in a proportion of at least 50% by weight, preferably of at least 60% by weight, more preferably of at least 70% by weight, even more preferably of at least 80% by weight, most preferably of at least 90% by weight, based in each case on the weight of the third sublayer. Particularly preferable, the third sublayer consists of the blend.

Preferably, the further adhesion promoter layer adjoins the inner polymer layer. In one configuration of the sheetlike composite of the invention in which the inner polymer layer is the polymer layer P, the inner polymer layer may include any of the aforementioned polymers as the first polymer.

In one embodiment 41 according to the invention, the sheetlike composite 1 is configured according to any of the preceding embodiments, wherein the carrier layer is overlaid on a side of the carrier layer remote from the barrier layer with an colour application, preferably a decoration. Preferably, the outer polymer layer is overlaid with the colour application on a side remote from the carrier layer. Preferably, the colour application includes at least one colourant, more preferably at least 2, more preferably at least 3, more preferably at least 4, even more preferably at least 5 and most preferably at least 6 colourants. In a further preferred embodiment, the colour application is between the carrier layer and the outer polymer layer.

In one embodiment 42 according to the invention, the sheetlike composite 1 is configured according to any of its preceding embodiments, wherein the sheetlike composite includes a polymer interlayer between the carrier layer and the barrier layer. In a preferred embodiment, the sheetlike composite includes the polymer layer P as the polymer interlayer. In a further preferred embodiment, the sheetlike composite comprises the polymer interlayer in addition to the polymer layer P. In both cases, the polymer interlayer preferably includes a polyethylene or a polypropylene or both. In this context, a particularly preferred polyethylene is an LDPE. Preferably, the polymer interlayer includes the polyethylene or the polypropylene or both together in a proportion of at least 20% by weight, more preferably at least 30% by weight, more preferably at least 40% by weight, more preferably at least 50% by weight, more preferably at least 60% by weight, more preferably at least 70% by weight, more preferably at least 80% by weight, most preferably at least 90% by weight, based in each case on the total weight of the polymer interlayer. Additionally or alternatively, the polymer interlayer preferably includes an HDPE, preferably in a proportion of at least 10% by weight, more preferably at least 20% by weight, more preferably at least 30% by weight, more preferably at least 40% by weight, more preferably at least 50% by weight, more preferably at least 60% by weight, more preferably at least 70% by weight, more preferably at least 80% by weight, most preferably at least 90% by weight, based in each case on the total weight of the polymer interlayer. In this context, the polymer interlayer includes the aforementioned polymers preferably in a polymer blend. The polymer interlayer preferably has a thickness within a range from 10 to 30 μm, more preferably of 12 to 28 μm. Preferably, the polymer interlayer adjoins a layer surface of the barrier substrate layer facing the outer face of the sheetlike composite. Additionally or alternatively, the polymer interlayer preferably adjoins the carrier layer. In one configuration of the sheetlike composite of the invention in which the polymer interlayer is the polymer layer P, the polymer interlayer may include any of the aforementioned polymers as the first polymer.

In one embodiment 43 according to the invention, the sheetlike composite 1 is configured according to any of its preceding embodiments, wherein the sheetlike composite is a blank for production of a single closed container.

In one embodiment 44 according to the invention, the sheetlike composite 1 is configured according to any of its preceding embodiments, wherein the carrier layer comprises one selected from the group consisting of cardboard, paperboard and paper, or a combination of at least two of these.

In one embodiment 45 according to the invention, the sheetlike composite 1 is configured according to any of its preceding embodiments, wherein the sheetlike composite includes a linear recess on the outer face. A preferred linear recess has a length of at least 1 cm, preferably of at least 2 cm, more preferably of at least 10 cm. A particularly preferred linear recess extends from one edge of the sheetlike composite to a further edge, preferably opposite the first edge, of the sheetlike composite. A further preferred linear recess is a linear displacement of material. A preferred linear displacement of material is a groove.

A contribution to the achievement of at least one of the objects of the invention is made by an embodiment 1 of a method 1 comprising, as method steps,
a) providing
i) a sheetlike composite precursor including a carrier layer, and
ii) a polymer composition; and
b) overlaying the carrier layer with the polymer composition, thereby obtaining a polymer layer P overlaying the carrier layer;
wherein the polymer composition includes
a. a first polymer,
b. a first type of inorganic particles in a proportion within a range from 5% to 30% by weight, preferably from 5% to 25% by weight, more preferably from 8% to 21% by weight, more preferably from 10% to 18% by weight, more preferably from 12% to 18% by weight, even more preferably from 14% to 18% by weight, most preferably from 14% to 16% by weight, and
c. a further type of inorganic particles in a proportion within a range from 0.5% to 2.5% by weight, preferably from 0.5% to 2.2% by weight, more preferably from 0.5% to 2.0% by weight, more preferably from 0.7% to 1.8% by weight, even more preferably from 0.9% to 1.5% by weight, even more preferably from 1.0% to 1.4% by weight, most preferably from 1.1% to 1.3% by weight,
the percentages by weight are each based on the weight of the polymer composition. Preferably, the carrier layer or the polymer layer P is configured or both are configured according to one embodiment of the sheetlike composite 1 of the invention. Preferably, in the method step b), the polymer layer P is obtained from the polymer composition.

In one embodiment 2 according to the invention, the method 1 is configured according to its embodiment 1, wherein the inorganic particles of the first type include and preferably consist of a titanium oxide. A preferred titanium oxide is $TiO_2$.

In one embodiment 3 according to the invention, the method 1 is configured according to its embodiment 2, wherein the polymer composition comprises the titanium oxide in a proportion within a range from 5% to 30% by weight, preferably from 5% to 25% by weight, more preferably from 8% to 21% by weight, more preferably from 10% to 18% by weight, more preferably from 12% to 18% by weight, even more preferably from 14% to 18% by weight, most preferably from 14% to 16% by weight, based in each case on the weight of the polymer composition.

In one embodiment 4 according to the invention, the method 1 is configured according to any of its embodiments 1 to 3, wherein the inorganic particles of the further type include elemental carbon.

In one embodiment 5 according to the invention, the method 1 is configured according to any of its embodiments 1 to 4, wherein the inorganic particles of the further type are carbon black particles.

In one embodiment 6 according to the invention, the method 1 is configured according to any of its embodiments 1 to 5, wherein the first polymer is a thermoplastic polymer.

In one embodiment 7 according to the invention, the method 1 is configured according to any of its embodiments 1 to 6, wherein the first polymer is a polyolefin.

In one embodiment 8 according to the invention, the method 1 is configured according to its embodiment 7, wherein the polyolefin is a polyethylene or a polypropylene or both. In this context, a preferred polyethylene is an LDPE.

In one embodiment 9 according to the invention, the method 1 is configured according to any of its preceding embodiments 1 to 8, wherein the polymer composition comprises the first polymer in a proportion within a range from 30% to 94.5% by weight, preferably from 40% to 94.5%, more preferably from 50% to 94.5% by weight, more preferably from 60% to 94.5% by weight, more preferably from 70% to 94.5% by weight, more preferably from 80% to 94.5% by weight, more preferably from 80% to 90% by weight, even more preferably from 82% to 90% by weight, even more preferably from 82% to 88% by weight, most preferably from 82% to 85% by weight, based in each case on the weight of the polymer layer P. Preferably, the polymer composition comprises the inorganic particles of the first type in a first proportion in % by weight, the inorganic particles of the further type in a further proportion in % by weight, and the first polymer in a proportion of (100% by weight-first proportion-further proportion) in % by weight, the percentages by weight each being based on the weight of the polymer composition.

In one embodiment 10 according to the invention, the method 1 is configured according to any of its embodiments 1 to 9, wherein, in the method step b), the polymer composition is overlaid to a basis weight within a range from 5 to 35 g/m$^2$, preferably from 5 to 30 g/m$^2$, more preferably from 5 to 25 g/m$^2$, most preferably from 10 to 25 g/m$^2$.

In one embodiment 11 according to the invention, the method 1 is configured according to one of its embodiments 1 to 10, wherein the sheetlike composite precursor is provided in the method step a) in rolled-up form forming a roll.

In one embodiment 12 according to the invention, the method 1 is configured according to any of its embodiment 1 to 11, wherein the polymer layer P has an L value in the L*a*b* colour space within a range from 30 to 56, preferably from 32 to 54, more preferably from 32 to 52, more preferably from 34 to 52, more preferably from 34 to 50, even more preferably from 36 to 50, most preferably from 36 to 48.

In one embodiment 13 according to the invention, the method 1 is configured according to any of its embodiments 1 to 12, wherein the carrier layer has a transmittance for light within a wavelength range from 475 to 480 nm of at least 0.4%, preferably within a range from 0.4% to 5%, more preferably from 0.4% to 4%, even more preferably from 0.5% to 3.5%.

In one embodiment 14 according to the invention, the method 1 is configured according to any of its embodiments 1 to 13, wherein the carrier layer is characterized by a basis weight within a range from 140 to 400 g/m$^2$, preferably from 150 to 350 g/m$^2$, more preferably from 160 to 330 g/m$^2$, even more preferably from 160 to 300 g/m$^2$, even more preferably from 160 to 250 g/m$^2$, most preferably from 160 to 240 g/m$^2$.

In one embodiment 15 according to the invention, the method 1 is configured according to any of its embodiments 1 to 14, wherein the carrier layer has at least one hole, wherein the at least one hole is covered in the method step b) by the polymer layer P as hole-covering layer.

In one embodiment 16 according to the invention, the method 1 is configured according to any of its embodiments 1 to 15, wherein the method further comprises a method step of
c) overlaying the carrier layer with a barrier layer.

Preferably, the barrier layer is configured according to one embodiment of the sheetlike composite 1 of the invention. In a preferred configuration of the method, the carrier layer is overlaid with the polymer composition in the method step b) on a first side of the carrier layer, wherein the carrier layer is overlaid with the barrier layer in the method step c) on an opposite side of the carrier layer from the first side. An outer polymer layer is preferably obtained here from the polymer composition. The outer polymer layer is preferably configured according to one embodiment of the sheetlike composite 1 of the invention. In addition, a polymer interlayer is preferably disposed here in the method step c) between the carrier layer and the barrier layer. The polymer interlayer is preferably configured according to one embodiment of the sheetlike composite 1 of the invention. Further preferably, the sheetlike composite precursor in the method step a) includes a colour application overlaying the carrier layer on the first side. Alternatively, the polymer layer P is overlaid with a colourapplication on a side remote from the carrier layer after the method step b), preferably after the method step c), even more preferably after the method step d). In each case, the colour application is preferably configured according to one embodiment of the sheetlike composite 1 of the invention.

In a further preferred configuration of the method, the carrier layer is overlaid with the polymer composition in the method step b) on a first side of the carrier layer, wherein the carrier layer is overlaid with the barrier layer in the method step c) likewise on the first side of the carrier layer. A polymer interlayer is preferably obtained here from the polymer composition. The polymer interlayer is preferably configured according to one embodiment of the sheetlike composite 1 of the invention. In addition, in this configuration, the sheetlike composite precursor in the method step a) includes an outer polymer layer that overlays the carrier layer on an opposite side of the carrier layer from the first side. The outer polymer layer is preferably configured according to one embodiment of the sheetlike composite 1 of the invention. Further preferably, the sheetlike composite precursor in the method step a) includes a colour application overlaying the carrier layer on an opposite side from the first side. Preferably, the colour application is disposed between the carrier layer and the outer polymer layer. Alternatively, the carrier layer is overlaid with a colour application on a side remote from the barrier layer after the method step b), preferably after the method step c), even more preferably after the method step d). Preferably, the outer polymer layer is overlaid here with the colour application on a side remote from the carrier layer. In each case, the colour application is preferably configured according to one embodiment of the sheetlike composite 1 of the invention.

In one embodiment 17 according to the invention, the method 1 is configured according to its embodiment 16, wherein the method additionally comprises, prior to the method step c),
I) providing the barrier layer as a film, and
II) adjusting a surface tension of at least part of a surface of the barrier layer, facing the carrier layer in the method step c), to a value within a range from $38 \cdot 10^{-3}$ N/m to $70 \cdot 10^{-3}$ N/m, preferably from $40 \cdot 10^{-3}$ N/m to $65 \cdot 10^{-3}$ N/m, more preferably from $45 \cdot 10^{-3}$ N/m to $62 \cdot 10^{-3}$ N/m, most preferably from $50 \cdot 10^{-3}$ N/m to $62 \cdot 10^{-3}$ N/m.

Preferably, the surface tension of the at least part of the surface of the barrier layer, preferably a surface of the barrier substrate layer, is increased. The adjustment is preferably effected by a surface treatment. A preferred surface treatment is one selected from the group consisting of a plasma treatment, a corona treatment and a flame treatment, or a combination of at least two of these. Further preferably, the aforementioned surface treatment is effected, more preferably in the case of the plasma treatment, in a vacuum.

In one embodiment 18 according to the invention, the method 1 is configured according to either of its embodiments 16 and 17, wherein the at least one hole is additionally covered in the method step c) at least by the barrier layer.

In one embodiment 19 according to the invention, the method 1 is configured according to any of its embodiments 16 to 18, wherein the method further comprises a method step of d) overlaying the barrier layer on a side of the barrier layer remote from the carrier layer with an inner polymer layer.

Preferably, the inner polymer layer is configured according to one embodiment of the sheetlike composite 1 of the invention.

In one embodiment 20, the method 1 is configured according to its embodiment 19, wherein the method additionally includes, prior to the method step d), adjusting the surface tension of at least part of a surface of the barrier layer on the side of the barrier layer which in the method step d) is remote from the carrier layer to a value within a range from $38 \cdot 10^{-3}$ N/m to $70 \cdot 10^{-3}$ N/m, preferably from $40 \cdot 10^{-3}$ N/m to $65 \cdot 10^{-3}$ N/m, more preferably from $45 \cdot 10^{-3}$ N/m to $62 \cdot 10^{-3}$ N/m, most preferably from $50 \cdot 10^{-3}$ N/m to $62 \cdot 10^{-3}$ N/m. Preferably, the surface tension of the at least part of the surface of the barrier layer, preferably a surface of the barrier material layer or the protective layer, is increased. The adjustment is preferably effected by a surface treatment. A preferred surface treatment is one selected from the group consisting of a plasma treatment, a corona treatment and a flame treatment, or a combination of at least two of these. Further preferably, the aforementioned surface treatment is effected, more preferably in the case of the plasma treatment, in a vacuum.

In one embodiment 21 according to the invention, the method 1 is configured according to one of its embodiments 1 to 15, wherein the sheetlike composite precursor in method step a) includes a barrier layer overlaying the carrier layer, wherein the barrier layer is overlaid with the polymer composition in method step b) on a side remote from the carrier layer. An inner polymer layer or a sublayer of an inner polymer layer is preferably obtained here from the polymer composition. The inner polymer layer or the aforementioned sublayer of the inner polymer layer is preferably configured according to one embodiment of the sheetlike composite 1 of the invention. In this configuration, the sheetlike composite precursor preferably includes a polymer interlayer disposed between the carrier layer and the barrier layer. The polymer interlayer is preferably configured according to one embodiment of the sheetlike composite 1 of the invention. Further preferably, the sheetlike composite precursor includes an outer polymer layer overlaying the carrier layer on a side of the carrier layer remote from the barrier layer. The outer polymer layer is preferably configured according to one embodiment of the sheetlike composite 1 of the invention. Further preferably, the sheetlike composite precursor includes a colour application overlaying the carrier layer on a side of the carrier layer remote from the barrier layer. In a preferred configuration, the colour application is disposed between the outer polymer layer and the carrier layer. In a further configuration, the colour application overlays the outer polymer layer on a side of the outer polymer layer remote from the carrier layer. In each case, the colour application is preferably configured according to one embodiment of the sheetlike composite 1 of the invention.

In one embodiment 22, the method 1 is configured according to its embodiment 21, wherein the method additionally includes, prior to method step b), adjusting the surface tension of at least part of a surface of the barrier layer on the side of the barrier layer which in the method step b) is remote from the carrier layer to a value within a range from $38 \cdot 10^{-3}$ N/m to $70 \cdot 10^{-3}$ N/m, preferably from $40 \cdot 10^{-3}$ N/m to $65 \cdot 10^{-3}$ N/m, more preferably from $45 \cdot 10^{-3}$ N/m to $62 \cdot 10^{-3}$ N/m, most preferably from $50 \cdot 10^{-3}$ N/m to $62 \cdot 10^{-3}$ N/m. Preferably, the surface tension of the at least part of the surface of the barrier layer, preferably a surface of the barrier material layer or the protective layer, is increased. The adjustment is preferably effected by a surface treatment. A preferred surface treatment is one selected from the group consisting of a plasma treatment, a corona treatment and a flame treatment, or a combination of at least two of these. Further preferably, the aforementioned surface treatment is effected, more preferably in the case of the plasma treatment, in a vacuum.

In one embodiment 23 according to the invention, the method 1 is configured according to its embodiment 21 or 22, wherein the at least one hole is additionally covered at least by the barrier layer.

In one embodiment 24 according to the invention, the method 1 is configured according to any of its embodiments 1 to 23, wherein a sheetlike composite is obtained from the sheetlike composite precursor, wherein the method additionally includes cutting the sheetlike composite to size to give a blank for production of a single closed container.

In one embodiment 25 according to the invention, the method 1 is configured according to any of its embodiments 1 to 21, wherein the method is a method of producing a sheetlike composite.

In one embodiment 26 according to the invention, the method 1 is configured according to any of its embodiments 1 to 22, wherein the method further includes producing a linear recess in the carrier layer. A preferred way of producing a linear recess is grooving. Grooving is preferably effected by the action of a grooving tool on the carrier layer. In a preferred embodiment, the linear recess is produced prior to the method step b). In a further preferred embodiment, the linear recess is produced after the method step c), preferably in an additional method step e).

A contribution to the achievement of at least one of the objects of the invention is made by an embodiment 1 of a sheetlike composite 2 obtainable by the method 1 according to any of its embodiments 1 to 26. Preferably, the sheetlike composite 2 has the features of the sheetlike composite 1 according to any of its embodiments.

A contribution to the achievement of at least one of the objects of the invention is made by an embodiment 1 of a container precursor 1 including at least one sheetlike region of the sheetlike composite 1 or 2, in each case according to any of its embodiments.

In one embodiment 2 according to the invention, the container precursor 1 is configured according to its embodiment 1, wherein the sheetlike composite comprises at least two folds, preferably at least 3 folds, more preferably at least 4 folds.

In one embodiment 3 according to the invention, the container precursor 1 is configured according to its embodiment 1 or 2, wherein the sheetlike includes comprises a first longitudinal edge and a further longitudinal edge, wherein the first longitudinal edge is joined to the further longitudinal edge, thereby forming a longitudinal seam of the container precursor.

A contribution to the achievement of at least one of the objects of the invention is made by an embodiment 1 of a closed container 1 including at least one sheetlike region of the sheetlike composite 1 or 2, in each case according to any of its embodiments.

In one embodiment 2 according to the invention, the closed container 1 is configured according to its embodiment 1, wherein the sheetlike composite comprises at least two folds, preferably at least 3 folds, more preferably at least 4 folds.

In one embodiment 3 according to the invention, the closed container 1 is configured according to its embodiment 1 or 2, wherein the sheetlike composite comprises a first longitudinal edge and a further longitudinal edge, wherein the first longitudinal edge is joined to the further longitudinal edge, thereby forming a longitudinal seam of the closed container.

In one embodiment 4 according to the invention, the closed container 1 is configured according to any of its embodiments 1 to 3, wherein the closed container comprises a food or drink product.

A contribution to the achievement of at least one of the objects of the invention is made by an embodiment 1 of a method 2 comprising, as method steps,
 a. providing at least one sheetlike region of the sheetlike composite 1 or 2, in each case according to its embodiments, said at least one sheetlike region including a first longitudinal edge and a further longitudinal edge;
 b. folding the at least one sheetlike region; and
 c. contacting and joining the first longitudinal edge to the further longitudinal edge, thereby obtaining a longitudinal seam.

The method 2 is preferably a method of producing a container precursor. A preferred container precursor is a precursor of a food or drink product container. The joining in the method step c. is preferably effected in the form of sealing.

A contribution to the achievement of at least one of the objects of the invention is made by an embodiment 1 of a container precursor 2, obtainable by the method 2 according to its embodiment 1.

A contribution to the achievement of at least one of the objects of the invention is made by an embodiment 1 of a method 3 comprising, as method steps,
 A. providing the container precursor 1 or 2, in each case according to any of its embodiments;
 B. forming a base region of the container precursor by folding the sheetlike composite;
 C. closing the base region;
 D. filling the container precursor with a food or drink product; and
 E. closing the container precursor in a top region, thereby obtaining a closed container.

The method 3 is preferably a method of producing a closed container. A preferred closed container is a food or drink product container. The closing in the method step C. preferably comprises sealing, more preferably hot air sealing. The closing in the method step E. preferably comprises sealing, more preferably ultrasound sealing.

In one embodiment 2 according to the invention, the method 3 is configured according to its embodiment 1, wherein at least part of the sheetlike composite during the folding in the method step B. has a temperature within a range from 10 to 50° C., preferably from 15 to 40° C., more preferably from 16 to 30° C., most preferably from 18 to 25° C.

In one embodiment 3 according to the invention, the method 3 is configured according to its embodiment 1 or 2, wherein the sealing in the method step C. or E. or in both comprises sealing, wherein the sealing is effected by one selected from the group consisting of irradiation, contacting with a hot solid, inducement of mechanical vibration and contacting with a hot gas, or by a combination of at least two of these. In this case, a different sealing method from the aforementioned group may be used in the method step C. from that in the method step E. and vice versa. However, it is also possible to use the same sealing method.

In one embodiment 4 according to the invention, the method 3 is configured according to any of its embodiments 1 to 3, wherein the method further comprises a method step of
 F. joining the closed container to an opening aid.

A contribution to the achievement of at least one of the objects of the invention is made by an embodiment 1 of a closed container 2 obtainable by the method 3 according to any of its embodiments 1 to 4.

A contribution to the achievement of at least one of the objects of the invention is made by an embodiment 1 of a use 1 of the sheetlike composite 1 or 2, in each case according to any of its embodiments, for production of a food or drink product container. A preferred food or drink product container is a closed container filled with a food or drink product.

A contribution to the achievement of at least one of the objects of the invention is made by an embodiment 1 of a use 2 of a composition including
 i) a multitude of titanium oxide particles in a proportion within a range from 30% to 70% by weight, preferably from 40% to 60% by weight, more preferably from 45% to 55% by weight, and
 ii) a multitude of carbon black particles in a proportion within a range from 0.5% to 20% by weight, preferably from 1% to 15% by weight, more preferably from 1% to 10% by weight.

based in each case on the weight of the composition, for production of a sheetlike composite for a food or drink product container. A preferred sheetlike composite here is the sheetlike composite 1 of the invention according to any of its embodiments. Preferably, the sheetlike composite is produced according to any embodiment of the method 1 of the invention, wherein the polymer composition is obtained from the composition in the method step a).

In one embodiment 2 according to the invention, the use 2 is configured according to its embodiment 1, wherein the composition additionally includes a polyethylene in a proportion within a range from 5% to 69.5% by weight, preferably from 10% to 69.5% by weight, more preferably 20% to 59% by weight, more preferably from 25% to 59% by weight, more preferably from 30% to 54% by weight, most preferably from 35% to 54% by weight, based in each case on the weight of the composition. A preferred polyethylene is an LDPE.

A contribution to the achievement of at least one of the objects of the invention is made by an embodiment 1 of a use 3 of a composition including
 i) a multitude of titanium oxide particles in a proportion within a range from 40% to 80% by weight, preferably from 50% to 70% by weight, more preferably from 55% to 65% by weight, and
 ii) a polyethylene in a proportion of at least 15% by weight, preferably at least 20% by weight, more preferably at least 30% by weight.

based in each case on the weight of the composition, for production of a sheetlike composite for a food or drink product container. A preferred polyethylene is an LDPE. A preferred sheetlike composite here is the sheetlike composite 1 of the invention according to any of its embodiments. Preferably, the sheetlike composite is produced according to any embodiment of the method 1 of the invention, wherein the polymer composition is obtained from the composition in the method step a).

A contribution to the achievement of at least one of the objects of the invention is made by an embodiment 1 of a use 4 of a composition including
i) a multitude of carbon black particles in a proportion within a range from 10% to 60% by weight, preferably from 20% to 60% by weight, more preferably from 25% to 50% by weight, and
ii) a polyethylene in a proportion of at least 30% by weight, preferably at least 40% by weight,
based in each case on the weight of the composition, for production of a sheetlike composite for a food or drink product container. A preferred polyethylene is an LDPE. A preferred sheetlike composite here is the sheetlike composite 1 of the invention according to any of its embodiments. Preferably, the sheetlike composite is produced according to any embodiment of the method 1 of the invention, wherein the polymer composition is obtained from the composition in the method step a).

A contribution to the achievement of at least one of the objects of the invention is made by an embodiment 1 of a use 5 of at least one sheetlike region of the sheetlike composite 1 or 2, in each case according to any of its embodiments, in a microwave oven. In this case, the at least one sheetlike region of the sheetlike composite, preferably a blank of the sheetlike composite, is encompassed by a container which in turn comprises a food or drink product which is to be heated by irradiation with microwaves in the microwave oven.

Features which are described as preferred in one category of the invention, for example for the sheetlike composite 1, are likewise preferred in an embodiment of the further categories of the invention, for example an embodiment of the method 1 of the invention.

Polymer Layer P

The polymer layer P of the invention is preferably a sheet of the sheetlike composite based on one or more polymers. In addition, the polymer layer P may include one or more additives, where one or more additives are preferably present in the polymer layer P as a multitude of particles. A preferred additive here is inorganic. Accordingly, the polymer layer P preferably includes a first type of inorganic particles, and more preferably additionally a further type of inorganic particles. The inorganic particles of the first type and the further type preferably differ in colour, more preferably in brightness. The inorganic particles of the first type are preferably brighter than the inorganic particles of the further type. Particularly preferable, the inorganic particles of the first type are white particles and the inorganic particles of the further type are grey or black, more preferably black, particles. Preferably, the inorganic particles of the first type have a particle size distribution having a $D_{50}$ within a range from 50 to 800 nm, preferably from 100 to 600 nm, more preferably from 200 to 400 nm. Additionally or alternatively, the inorganic particles of the further type have a particle size distribution having a $D_{50}$ within a range from 1 to 100 nm, preferably from 2 to 90 nm, more preferably from 3 to 80 nm. The inorganic particles of the first type include and preferably consist of a titanium oxide. A particularly preferred titanium oxide here is $TiO_2$. The $TiO_2$ is preferably in the rutile modification. The inorganic particles of the further type preferably include elemental carbon. The inorganic particles of the further type are particularly preferable carbon black particles. Carbon black is a black, pulverulent solid which, according to its quality and use, consists typically to an extent of 80% to 99.5% by weight of carbon. Herein, the term "carbon black" encompasses both industrial products (in the art, often referred to as carbon black) and by-products from combustion processes (in the art, often referred to as soot). Carbon black produced under controlled conditions is also referred to as industrial black.

Adhesion/Adhesion Promoter Layer

An adhesion promoter layer is a layer of the sheetlike composite including at least one adhesion promoter in a sufficient amount, so that the adhesion promoter layer improves adhesion between the layers adjoining the adhesion promoter layer. For this purpose, the adhesion promoter layer preferably includes an adhesion promoter polymer. Accordingly, the adhesion promoter layers are preferably polymeric layers.

The first adhesion promoter layer preferably has a first acrylate content and the further adhesion promoter layer a further acrylate content, where the first acrylate content and the further acrylate content are each within a range from 5% to 40% by weight, preferably from 8% to 40% by weight, more preferably from 10% to 40% by weight, more preferably from 15% to 40% by weight, even more preferably from 20% to 40% by weight, even more preferably from 20% to 35% by weight, most preferably from 20% to 30% by weight, based in each case on the weight of the respective adhesion promoter layer. Preferably, the first acrylate content and the further acrylate content differ from one another by not more than 10% by weight, preferably not more than 5% by weight, more preferably not more than 3% by weight, most preferably not more than 1% by weight. Further preferably, the first adhesion promoter layer includes an adhesion promoter polymer A and the further adhesion promoter layer an adhesion promoter polymer B. In this case, the adhesion promoter polymer A and the adhesion promoter polymer B may be the same or different. Preferably, the adhesion promoter polymer A and the adhesion promoter polymer B are the same. In a preferred embodiment, the first adhesion promoter layer includes the adhesion promoter polymer A in a proportion within a range from 30% to 100% by weight, preferably from 40% to 100% by weight, more preferably from 50% to 100% by weight, more preferably from 60% to 100% by weight, more preferably from 70% to 100% by weight, more preferably from 80% to 100% by weight, most preferably from 90% to 100% by weight, based in each case on the weight of the first adhesion promoter layer. Additionally or alternatively, the further adhesion promoter layer preferably includes the adhesion promoter polymer B in a proportion within a range from 30% to 100% by weight, preferably from 40% to 100% by weight, more preferably from 50% to 100% by weight, more preferably from 60% to 100% by weight, more preferably from 70% to 100% by weight, more preferably from 80% to 100% by weight, most preferably from 90% to 100% by weight, based in each case on the weight of the further adhesion promoter layer. Preferably, the first adhesion promoter layer consists of the adhesion promoter polymer A. Additionally or alternatively, the further adhesion promoter layer preferably consists of the adhesion promoter polymer B. Useful adhesion promoter polymers in an adhesion promoter layer, especially in the first adhesion promoter layer and in the further adhesion promoter layer, i.e. very particularly as adhesion promoter polymer A and as adhesion promoter polymer B, include all polymers which are suitable for producing a firm bond through functionalization by means of suitable functional groups, through the forming of ionic bonds or covalent bonds with a surface of a respective adjacent layer. They are preferably functionalized polyolefins. Preferably, the adhesion promoter polymer A is based on at least 3 mutually different monomers and, independently, the adhesion promoter polymer B is preferably based on at least 3 mutually different monomers. In a preferred configuration of the sheetlike composite of the invention, the adhesion promoter polymer A is based at least one, preferably on at least 2, more preferably on at least 3, of the same monomers as the adhesion promoter polymer B. More preferably, the adhesion promoter polymer A and the adhesion promoter polymer B are the same. The adhesion promoter polymer A and the adhesion promoter polymer B are preferably terpolymers. A terpolymer here is a polymer which is prepared by polymerization of three different monomers. Terpolymers are prepared, for example, by grafting of a further monomer onto a dimer composed of two different monomers (graft copolymerization), bulk polymerization or else random copolymerization of three monomers. In this case, the adhesion promoter polymer A and the adhesion promoter polymer B may be the same or different terpolymers. Preferably, the adhesion promoter polymer A and the adhesion promoter polymer B are the same terpolymer. The adhesion promoter polymer A and the adhesion promoter polymer B are preferably each polyolefin-acrylate copolymers. In this case, the adhesion promoter polymer A and the adhesion promoter polymer B may be the same or different polyolefin-acrylate copolymers. The adhesion promoter polymer A and the adhesion promoter polymer B are preferably the same polyolefin-acrylate copolymer. The polyolefin in the adhesion promoter polymer A or the polyolefin in the adhesion promoter polymer B, or each of them, is based preferably on ethylene. The adhesion promoter A or the adhesion promoter polymer B, or each of them, is preferably a polyolefin-alkyl acrylate copolymer. The alkyl group selected is preferably a methyl, ethyl, propyl, i-propyl, butyl, i-butyl or a pentyl group. A particularly preferred polyolefin-alkyl acrylate copolymer is a polyolefin-ethyl acrylate copolymer. If the adhesion promoter polymer A and the adhesion promoter polymer B are polyolefin-alkyl acrylate copolymers, the adhesion promoter polymer A and the adhesion promoter polymer B may be the same or different polyolefin-alkyl acrylate copolymers. The adhesion promoter polymer A and the adhesion promoter polymer B here are preferably the same polyolefin-alkyl acrylate copolymer. Further preferably, the first adhesion promoter layer or the further adhesion promoter layer, or each of them, may have a mixture of two or more different polyolefin-alkyl acrylate copolymers. Likewise preferably, the polyolefin-alkyl acrylate copolymer may have two or more different alkyl groups in the acrylate function, for example a polyolefin-alkyl acrylate copolymer in which both, methyl acrylate units and ethyl acrylate units, occur in the same copolymer. Additionally or alternatively to the aforementioned features, the adhesion promoter polymer A or the adhesion promoter polymer B, or each of them, is preferably a grafted copolymer. Preferably, the polyolefin-acrylate copolymer has been grafted, i.e. is the same as the grafted copolymer. If the adhesion promoter polymer A and the adhesion promoter polymer B are grafted copolymers, these may be the same or different. The adhesion promoter polymer A and the adhesion promoter polymer B are preferably the same grafted copolymer. Further preferably, the adhesion promoter polymer A or the adhesion promoter polymer B, or each of them, is a copolymer grafted with a diacid anhydride. A preferred diacid anhydride here is a maleic anhydride. If the adhesion promoter polymer A and the adhesion promoter polymer B are copolymers grafted with a diacid anhydride, these may be the same or different and are preferably the same.

Between layers of the sheetlike composite, none of which is an adhesion promoter layer and which need not necessarily adjoin one another, there may also be an adhesion promoter layer of the sheetlike composite which is additional to the first and further adhesion promoter layers. Preferred functionalized polyolefins for such additional adhesion promoter layers are acrylic acid copolymers which have been obtained by copolymerization of ethylene with acrylic acids such as acrylic acid, methacrylic acid, crotonic acid, acrylates, acrylate derivatives or carboxylic anhydrides that bear double bonds, for example maleic anhydride, or at least two of these. Among these, preference is given to polyethylene-maleic anhydride graft polymers (EMAH), ethylene-acrylic acid copolymers (EAA) or ethylene-methacrylic acid copolymers (EMAA), which are sold, for example, under the Bynel® and Nucrel®0609HSA trade names by DuPont or the Escor®6000ExCo trade name by ExxonMobil Chemicals.

According to the invention, it is preferable that the adhesion between a carrier layer, a polymer layer or a barrier layer and the next layer in each case is at least 0.5 N/15 mm, preferably at least 0.7 N/15 mm and especially preferably at least 0.8 N/15 mm. In one configuration according to the invention, it is preferable that the adhesion between a polymer layer and a carrier layer is at least 0.3 N/15 mm, preferably at least 0.5 N/15 mm and especially preferably at least 0.7 N/15 mm. It is further preferable that the adhesion between a barrier layer and a polymer layer is at least 0.8 N/15 mm, preferably at least 1.0 N/15 mm and especially preferably at least 1.4 N/15 mm. If a barrier layer indirectly follows a polymer layer with an adhesion promoter layer in between, it is preferable that the adhesion between the barrier layer and the adhesion promoter layer is at least 1.8 N/15 mm, preferably at least 2.2 N/15 mm and especially preferably at least 2.8 N/15 mm. In a particular configuration, the adhesion between the individual layers is sufficiently strong that a carrier layer is torn apart in the adhesion test, called a cardboard fibre tear in the case of a cardboard as the carrier layer.

Barrier Layer

The barrier layer preferably has sufficient barrier action against oxygen or water vapour or both. Accordingly, the barrier layer is preferably an oxygen barrier layer or a water vapour barrier layer or both. An oxygen barrier layer has a barrier effect against permeation of oxygen. A water vapour barrier layer has a barrier effect against permeation of water vapour. In principle, the barrier layer, for this purpose, may include one selected from the group consisting of a polymer barrier layer, a metal layer and oxide layer, or a combination of at least two of the above. The oxide layer here may be a metal oxide layer, for example an aluminium oxide layer, a semimetal oxide layer, for example a silicon oxide layer, or else a non-metal oxide layer. A preferred metal layer is an aluminium layer. In the aforementioned cases of the oxide layer and the metal layer, the barrier layer preferably includes a barrier substrate layer coated with the metal layer or the oxide layer. An illustrative method of coating a barrier substrate layer with a metal layer or an oxide layer is physical gas phase deposition (PVD). Preferably, the barrier layer has a transmittance for light within the wavelength range from 410 to 475 mm within a range from 0.5 to 1.0, preferably from 0.6 to 1.0, more preferably from 0.7 to 1.0, most preferably from 0.8 to 1.0. Additionally or alternatively, the barrier layer preferably has a transmittance for light within the wavelength range from 475 to 480 mm within a range from 0.5 to 1.0, preferably from 0.6 to 1.0, more preferably from 0.7 to 1.0, most preferably from 0.8 to 1.0.

If the barrier layer is a polymer barrier layer, this preferably includes at least 70% by weight, especially preferably at least 80% by weight and most preferably at least 95% by weight of at least one polymer which is known to the person skilled in the art for this purpose, especially for aroma or gas barrier properties suitable for packaging containers. Useful polymers, especially thermoplastics, here include N- or O-bearing polymers, either alone or in mixtures of two or more. According to the invention, it may be found to be advantageous when the polymer barrier layer has a melting temperature within a range from more than 155 to 300° C., preferably within a range from 160 to 280° C. and especially preferably within a range from 170 to 270° C. Further preferably, the polymer barrier layer has a basis weight within a range from 2 to 120 g/m², preferably within a range from 3 to 60 g/m², especially preferably within a range from 4 to 40 g/m² and further preferably from 6 to 30 g/m². Further preferably, the polymer barrier layer is obtainable from melts, for example by extrusion, especially laminar extrusion. Further preferably, the polymer barrier layer may also be introduced into the sheetlike composite via lamination. It is preferable in this context that a film is incorporated into the sheetlike composite. In another embodiment, it is also possible to select polymer barrier layers obtainable by deposition from a solution or dispersion of polymers. Suitable polymers preferably include those having a weight-average molecular weight, determined by gel permeation chromatography (GPC) by means of light scattering, within a range from $3 \cdot 10^3$ to $1 \cdot 10^7$ g/mol, preferably within a range from $5 \cdot 10^3$ to $1 \cdot 10^6$ g/mol and especially preferably within a range from $6 \cdot 10^3$ to $1 \cdot 10^5$ g/mol. Suitable polymers especially include polyamide (PA) or polyethylene vinyl alcohol (EVOH) or a mixture thereof. Among the polyamides, useful PAs are all of those that seem suitable to the person skilled in the art for the use according to the invention. Particular mention should be made here of PA 6, PA 6.6, PA 6.10, PA 6.12, PA 11 or PA 12 or a mixture of at least two of these, particular preference being given to PA 6 and PA 6.6 and further preference to PA 6. PA 6 is commercially available, for example, under the Akulon®, Durethan® and Ultramid® trade names. Additionally suitable are amorphous polyamides, for example MXD6, Grivory® and Selar® PA. It is further preferable that the PA has a density within a range from 1.01 to 1.40 g/cm³, preferably within a range from 1.05 to 1.30 g/cm³ and especially preferably within a range from 1.08 to 1.25 g/cm³. It is further preferable that the PA has a viscosity number within a range from 130 to 250 ml/g and preferably within a range from 140 to 220 ml/g. Useful EVOHs include all the EVOHs that seem suitable to the person skilled in the art for the use according to the invention. Examples of these are commercially available, inter alia, under the EVAL™ trade names from EVAL Europe NV, Belgium, in a multitude of different versions, for example the EVAL™ F104B or EVAL™ LR171B types.

More preferably in the context of the invention, the barrier layer includes, as mutually superposed layers, a barrier substrate layer and a barrier material layer. In a preferred configuration, the barrier layer further includes a protective layer on a side of the barrier material layer remote from the barrier substrate layer. This protective layer serves primarily to protect the barrier material layer from mechanical influences. The protective layer is frequently also referred to as a top coating or protective lacquer, although it need not necessarily be a lacquer by definition. The aforementioned preferred barrier layers with a barrier substrate layer and barrier material layer are commercially available as barrier films, for example from Toppan Printing Co. Ltd. According to the invention, it may be found to be advantageous when the barrier substrate layer or barrier material layer, or each of them, has a melting temperature within a range from more than 155 to 300° C., preferably within a range from 160 to 280° C. and especially preferably within a range from 170 to 270° C. Further preferably, the barrier layer may also be introduced into the sheetlike composite via lamination.

Barrier Substrate Layer

The barrier substrate layer may consist of any material that seems suitable to the person skilled in the art for use as a barrier substrate layer of the invention. In this context, the barrier substrate layer is preferably suitable for being coated with a barrier material to give an inventive thickness of the barrier material layer. Preferably, the layer surface is formed with sufficient smoothness for this purpose. Further preferably, the barrier substrate layer has a thickness within a range from 3 to 30 µm, preferably from 2 to 28 µm, more preferably from 2 to 26 µm, more preferably from 3 to 24 µm, more preferably from 4 to 22 µm, most preferably from 5 to 20 µm. In addition, the barrier substrate layer preferably has a barrier effect against oxygen or water vapour or both. Preferably, a barrier effect of the barrier material layer against permeation of oxygen is greater than a barrier effect of the barrier substrate layer against permeation of oxygen. Preferably, the barrier substrate layer has an oxygen permeation rate within a range from 0.1 to 50 $cm^3/(m^2 \cdot d \cdot bar)$, preferably from 0.2 to 40 $cm^3/(m^2 \cdot d \cdot bar)$, more preferably from 0.3 to 30 $cm^3/(m^2 \cdot d \cdot bar)$. A preferred barrier substrate layer includes, more preferably consists of, cellulose or a polymer or both. A preferred polymer here is an oriented polymer. The oriented polymer has preferably been monoaxially oriented or biaxially oriented. A further preferred polymer is a thermoplastic polymer. Preferably, the barrier substrate layer consists of the polymer.

Preferably, the barrier substrate layer includes a polymer selected from the group consisting of a polycondensate, a polyethylene, a polypropylene, a polyvinyl alcohol, or a combination of at least two of these, in a proportion of at least 50% by weight, preferably of at least 60% by weight, more preferably of at least 70% by weight, more preferably of at least 80% by weight, most preferably of at least 90% by weight, based in each case on the weight of the barrier substrate layer. More preferably, the barrier substrate layer consists of the aforementioned polymer. A preferred polypropylene has been oriented, especially longitudinally stretched (oPP) or biaxially stretched (BoPP). A preferred polycondensate is a polyester or polyamide (PA) or both. A preferred polyester is one selected from the group consisting of a polyethylene terephthalate (PET), a polylactide (PLA) and a combination of at least two of these. A preferred polyvinyl alcohol is a vinyl alcohol copolymer. A preferred vinyl alcohol copolymer is an ethylene-vinyl alcohol copolymer (EVOH).

Among the polyamides, useful PAs are all of those that seem suitable to the person skilled in the art for the use according to the invention. Particular mention should be made here of PA 6, PA 6.6, PA 6.10, PA 6.12, PA 11 or PA 12 or a mixture of at least two of these, particular preference being given to PA 6 and PA 6.6 and further preference to PA 6. PA 6 is commercially available, for example, under the Akulon®, Durethan® and Ultramid® trade names. Additionally suitable are amorphous polyamides, for example MXD6, Grivory® and Selar® PA. It is further preferable that the PA has a density within a range from 1.01 to 1.40 g/cm³, preferably within a range from 1.05 to 1.30 g/cm³ and especially preferably within a range from 1.08 to 1.25 g/cm³. It is further preferable that the PA has a viscosity number within a range from 130 to 250 ml/g and preferably within a range from 140 to 220 ml/g. Useful EVOHs include all the EVOHs that seem suitable to the person skilled in the art for the use according to the invention. Examples of these are commercially available, inter alia, under the EVAL™ trade names from EVAL Europe NV, Belgium, in a multitude of different versions, for example the EVAL™ F104B or EVAL™ L171B types. Preferred EVOHs have at least one, two, more than two or all of the following properties:

- an ethylene content within a range from 20 to 60 mol %, preferably from 24 to 45 mol %;
- a density within a range from 1.0 to 1.4 g/cm³, preferably from 1.1 to 1.3 g/cm³;
- a melting point within a range from more than 155 to 235° C., preferably from 165 to 225° C.;
- an MFR value (210° C./2.16 kg when $T_{m(EVOH)}$<230° C.; 230° C./2.16 kg when 210° C.<$T_{m(EVOH)}$<230° C.) within a range from 1 to 25 g/10 min, preferably from 2 to 20 g/10 min;
- an oxygen permeation rate within a range from 0.05 to 3.2 cm³·20 μm/m²·d·bar, preferably within a range from 0.1 to 2.5 cm³·20 μm/m²·d·bar.

Preferably at least one polymer layer, further preferably the inner polymer layer, or preferably all polymer layers, has/have a melting temperature below the melting temperature of the barrier substrate layer or of the barrier material layer or both. This is especially true when the barrier substrate layer is formed from polymer. In this case, the melting temperatures of the at least one polymer layer, especially the inner polymer layer, and the melting temperature of the barrier substrate layer or of the barrier material layer or both differ preferably by at least 1 K, especially preferably by at least 10 K, even more preferably by at least 50 K, further preferably at least 100 K. The temperature difference should preferably be chosen only such that it is sufficiently high that there is no melting of the barrier substrate layer or of the barrier material layer or both during the folding.

Barrier Material Layer

The barrier material layer used may be any material which is suitable for a person skilled in the art for this purpose and which has sufficient barrier action, especially with respect to oxygen or water vapour or both. In a preferred embodiment, the barrier material layer may take the form of a foil or of a deposited layer. A deposited barrier material layer is produced by way of example by vapour deposition of the barrier material on the barrier substrate layer. A preferred method for this purpose is physical gas phase deposition (PVD—physical vapour deposition) or preferably plasma-assisted gas phase deposition (CVD—chemical vapour deposition). The barrier material layer is preferably an uninterrupted layer.

Layers of the Sheetlike Composite

The layers of the layer sequence have been joined to one another. Two layers have been joined to one another when their adhesion to one another extends beyond van der Waals attraction forces. Layers that have been joined to one another preferably belong to a category selected from the group consisting of sealed to one another, adhesively bonded to one another and compressed to one another, or a combination of at least two of these. Unless stated otherwise, in a layer sequence, the layers may follow one another indirectly, i.e. with one or at least two intermediate layers, or directly, i.e. with no intermediate layer. This is the case especially in the form of words in which one layer overlays another layer. A form of words in which a layer sequence comprises enumerated layers means that at least the layers specified are present in the sequence specified. This form of words does not necessarily mean that these layers follow on directly from one another. A form of words in which two layers adjoin one another means that these two layers follow on from one another directly and hence with no intermediate layer. However, this form of words does not specify whether or not the two layers have been joined to one another. Instead, these two layers may be in contact with one another. Preferably, however, these two layers are joined to one another.

Polymer Layers

The term "polymer layer" refers hereinafter especially to the inner polymer layer, the polymer interlayer and the outer polymer layer, if these are not the polymer layer P. A preferred polymer is a polyolefin. The polymer layers may have further constituents. The polymer layers are preferably introduced into or applied to the sheetlike composite material in an extrusion method. The further constituents of the polymer layers are preferably constituents that do not adversely affect the behaviour of the polymer melt on application as a layer. The further constituents may, for example, be inorganic compounds, such as metal salts, or further polymers, such as further thermoplastics. However, it is also conceivable that the further constituents are fillers or pigments, for example carbon black or metal oxides. Suitable thermoplastics for the further constituents especially include those that are readily processible by virtue of good extrusion characteristics. Among these, polymers obtained by chain polymerization are suitable, especially polyesters or polyolefins, particular preference being given to cyclic olefin copolymers (COCs), polycyclic olefin copolymers (POCs), especially polyethylene and polypropylene, and very particular preference to polyethylene. Among the polyethylenes, preference is given to HDPE (high density polyethylene), MDPE (medium density polyethylene), LDPE (low density polyethylene), LLDPE (linear low density polyethylene) and VLDPE (very low density polyethylene) and mixtures of at least two of these. It is also possible to use mixtures of at least two thermoplastics. Suitable polymer layers have a melt flow rate (MFR) within a range from 1 to 25 g/10 min, preferably within a range from 2 to 20 g/10 min and more preferably within a range from 2.5 to 15 g/10 min, and a density within a range from 0.890 g/cm³ to 0.980 g/cm³, preferably within a range from 0.895 g/cm³ to 0.975 g/cm³, and further preferably within a range from 0.900 g/cm³ to 0.970 g/cm³. The polymer layers preferably have at least one melting temperature within a range from 80 to 155° C., preferably within a range from 90 to 145° C. and more preferably within a range from 95 to 135° C.

Inner Polymer Layer

The inner polymer layer is based on thermoplastic polymers, where the inner polymer layer may include a particulate inorganic solid. However, it is preferable that the inner polymer layer comprises one or more thermoplastic polymers to an extent of at least 70% by weight, preferably at least 80% by weight and more preferably at least 95% by weight, based in each case on the total weight of the inner polymer layer. Preferably, the polymer or polymer mixture of the inner polymer layer has a density (according to ISO 1183-1:2004) within a range from 0.900 to 0.980 g/cm³, more preferably within a range from 0.900 to 0.960 g/cm³ and most preferably within a range from 0.900 to 0.940 g/cm³. The polymer is preferably a polyolefin, mPolymer or a combination of the two. The inner polymer layer preferably comprises a polyethylene or a polypropylene or both. In this context, a particularly preferred polyethylene is an LDPE. Preferably, the inner polymer layer includes the polyethylene or the polypropylene or both together in a proportion of at least 30% by weight, more preferably at least 40% by weight, most preferably at least 50% by weight, based in each case on the total weight of the inner polymer layer. Additionally or alternatively, the inner polymer layer preferably includes an HDPE, preferably in a proportional at least 5% by weight, more preferably at least 10% by weight, more preferably at least 15% by weight, most preferably at least 20% by weight, based in each case on the total weight of the inner polymer layer. Additionally or alternatively to one or more of the aforementioned polymers, the inner polymer layer preferably includes a polymer prepared by means of a metallocene catalyst, preferably an mPE. Preferably, the inner polymer layer includes the mPE in a proportion of at least 3% by weight, more preferably at least 5% by weight, based in each case on the total weight of the inner polymer layer. In this case, the inner polymer layer may include 2 or more, preferably 2 or 3, of the aforementioned polymers in a polymer blend, for example at least a portion of the LDPE and the mPE, or at least a portion of the LDPE and the HDPE. In addition, the inner polymer layer may include 2 or more, preferably 3, mutually superposed sublayers which preferably form the inner polymer layer. The sublayers are preferably layers obtained by coextrusion. Preferably, the further adhesion promoter layer adjoins the inner polymer layer.

In a preferred configuration of the sheetlike composite, the inner polymer layer includes, in a direction from the outer face of the sheetlike composite to the inner face of the sheetlike composite, a first sublayer including an LDPE in a proportion of at least 50% by weight, preferably of at least 60% by weight, more preferably of at least 70% by weight, even more preferably of at least 80% by weight, most preferably of at least 90% by weight, based in each case on the weight of the first sublayer, and a further sublayer including a blend, wherein the blend includes an LDPE in a proportion of at least 30% by weight, preferably of at least 40% by weight, more preferably of at least 50% by weight, even more preferably of at least 60% by weight, most preferably of at least 65% by weight, and an mPE in a proportion of at least 10% by weight, preferably of at least 15% by weight, more preferably of at least 20% by weight, most preferably of at least 25% by weight, based in each case on the weight of the blend. In this case, the further sublayer includes the blend preferably in a proportion of at least 50% by weight, preferably of at least 60% by weight, more preferably of at least 70% by weight, even more preferably of at least 80% by weight, most preferably of at least 90% by weight, based in each case on the weight of the further sublayer. More preferably, the further sublayer consists of the blend.

In a further preferred configuration of the sheetlike composite, the inner polymer layer includes, in a direction from the outer face of the sheetlike composite to the inner face of the sheetlike composite, a first sublayer including an HDPE in a proportion of at least 30% by weight, preferably of at least 40% by weight, more preferably of at least 50% by weight, even more preferably of at least 60% by weight, most preferably of at least 70% by weight, and an LDPE in a proportion of at least 10% by weight, preferably of at least 15% by weight, more preferably of at least 20% by weight, based in each case on the weight of the first sublayer; a second sublayer including an LDPE in a proportion of at least 50% by weight, preferably of at least 60% by weight, more preferably of at least 70% by weight, even more preferably of at least 80% by weight, most preferably of at least 90% by weight, based in each case on the weight of the second sublayer; and a third sublayer including a blend, wherein the blend includes an LDPE in a proportion of at least 30% by weight, preferably of at least 40% by weight, more preferably of at least 50% by weight, even more preferably of at least 60% by weight, most preferably of at least 65% by weight, and an mPE in a proportion of at least 10% by weight, preferably of at least 15% by weight, more preferably of at least 20% by weight, most preferably of at least 25% by weight, based in each case on the weight of the blend. In this case, the third sublayer includes the blend preferably in a proportion of at least 50% by weight, preferably of at least 60% by weight, more preferably of at least 70% by weight, even more preferably of at least 80% by weight, most preferably of at least 90% by weight, based in each case on the weight of the third sublayer. More preferably, the third sublayer consists of the blend.

Outer Polymer Layer

The outer polymer layer preferably comprises a polyethylene or a polypropylene or both. Preferred polyethylenes here are LDPE and HDPE and mixtures of these. A preferred outer polymer layer comprises an LDPE to an extent of at least 50% by weight, preferably to an extent of at least 60% by weight, more preferably to an extent of at least 70% by weight, still more preferably to an extent of at least 80% by weight, most preferably to an extent of at least 90% by weight, based in each case on the weight of the outer polymer layer.

Polymer Interlayer

The polymer interlayer preferably adjoins the first adhesion promoter layer. The polymer interlayer preferably has a thickness within a range from 10 to 30 µm, more preferably of 12 to 28 µm. The polymer interlayer preferably comprises a polyethylene or a polypropylene or both. In this context, a particularly preferred polyethylene is an LDPE. Preferably, the polymer interlayer includes the polyethylene or the polypropylene or both together in a proportion of at least 20% by weight, more preferably at least 30% by weight, more preferably at least 40% by weight, more preferably at least 50% by weight, more preferably at least 60% by weight, more preferably at least 70% by weight, more preferably at least 80% by weight, most preferably at least 90% by weight, based in each case on the total weight of the polymer interlayer. Additionally or alternatively, the polymer interlayer preferably includes an HDPE, preferably in a proportion of at least 10% by weight, more preferably at least 20% by weight, more preferably at least 30% by weight, more preferably at least 40% by weight, more preferably at least 50% by weight, more preferably at least 60% by weight, more preferably at least 70% by weight, more preferably at least 80% by weight, most preferably at least 90% by weight, based in each case on the total weight of the polymer interlayer. In this context, the polymer interlayer includes the aforementioned polymers preferably in a polymer blend.

Carrier Layer

The carrier layer used may be any material which is suitable for a person skilled in the art for this purpose and which has sufficient strength and stiffness to impart stability to the container to such an extent that the container in the filled state essentially retains its shape. This is, in particular, a necessary feature of the carrier layer since the invention relates to the technical field of dimensionally stable containers. Dimensionally stable containers of this kind should in principle be distinguished from pouches and bags, which are usually produced from thin films. As well as a number of plastics, preference is given to plant-based fibrous materials, especially pulps, preferably limed, bleached and/or unbleached pulps, with paper and cardboard being especially preferred. Accordingly, a preferred carrier layer comprises a multitude of fibres. The basis weight of the carrier layer is preferably within a range from 120 to 450 g/m², especially preferably within a range from 130 to 400 g/m² and most preferably within a range from 150 to 380 g/m². A preferred cardboard generally has a single-layer or multilayer structure and may have been coated on one or both sides with one or else more than one cover layer. In addition, a preferred cardboard has a residual moisture content of less than 20% by weight, preferably of 2% to 15% by weight and especially preferably of 4% to 10% by weight, based on the total weight of the cardboard. An especially preferred cardboard has a multilayer structure. Further preferably, the cardboard has, on the surface facing the environment, at least one lamina, but more preferably at least two laminas, of a cover layer known to the person skilled in the art as a "coating slip". In addition, a preferred cardboard has a Scott bond value (according to Tappi T403um) within a range from 100 to 360 J/m², preferably from 120 to 350 J/m² and especially preferably from 135 to 310 J/m². By virtue of the aforementioned ranges, it is possible to provide a composite from which it is possible to fold a container with high integrity, easily and in low tolerances.

The carrier layer is characterized by a bending resistance which can be measured with a bending tester according to ISO 2493-2:2011 at a bending angle of 15°. The bending tester used is a L&W Bending Tester code 160 from Lorentzen & Wettre, Sweden. The carrier layer preferably has a bending resistance in a first direction in a range from 80 to 550 mN. In the case of a carrier layer that comprises a multitude of fibres, the first direction is preferably a direction of orientation of the fibres. A carrier layer that comprises a multitude of fibres also preferably has a bending resistance in a second direction, perpendicular to the first direction, in a range from 20 to 300 mN. The samples used for measuring the bending resistance with the above measuring device have a width of 38 mm and a clamping length of 50 mm. A preferred sheetlike composite with the carrier layer has a bending resistance in the first direction in a range from 100 to 700 mN. Further preferably, the aforementioned sheetlike composite has a bending resistance in the second direction in a range from 50 to 500 mN. The samples of the sheetlike composite used for measuring with the above measuring device also have a width of 38 mm and a clamping length of 50 mm.

Outer Face

The outer face of the sheetlike composite is a surface of a ply of the sheetlike composite which is intended to be in contact with the environment of the container in a container to be produced from the sheetlike composite. This does not oppose, in individual regions of the container, folding of the outer faces of various regions of the composite against one another or joining thereof to one another, for example sealing thereof to one another.

Inner Face

The inner face of the sheetlike composite is a surface of a ply of the sheetlike composite which is intended to be in contact with the contents of the container, preferably a food or drink product, in a container to be produced from the sheetlike composite.

Polyolefin

A preferred polyolefin is a polyethylene (PE) or a polypropylene (PP) or both. A preferred polyethylene is one selected from the group consisting of an LDPE, an LLDPE, and an HDPE, or a combination of at least two of these. A further preferred polyolefin is an mPolyolefin (polyolefin prepared by means of a metallocene catalyst). Suitable polyethylenes have a melt flow rate (MFR=MFI=melt flow index) within a range from 1 to 25 g/10 min, preferably within a range from 2 to 20 g/10 min and especially preferably within a range from 2.5 to 15 g/10 min, and a density within a range from 0.910 g/cm³ to 0.935 g/cm³, preferably within a range from 0.912 g/cm³ to 0.932 g/cm³, and further preferably within a range from 0.915 g/cm³ to 0.930 g/cm³.

mPolymer

An mPolymer is a polymer which has been prepared by means of a metallocene catalyst. A metallocene is an organometallic compound in which a central metal atom is arranged between two organic ligands, for example cyclopentadienyl ligands. A preferred mPolymer is an mPolyolefin, preferably an mPolyethylene or an mPolypropylene or both. A preferred mPolyethylene is one selected from the group consisting of an mLDPE, an mLLDPE, and an mHDPE, or a combination of at least two of these.

Melting Temperatures

A preferred mPolyolefin is characterized by at least one first melting temperature and a second melting temperature. Preferably, the mPolyolefin is characterized by a third melting temperature in addition to the first and second melting temperature. A preferred first melting temperature is within a range from 84 to 108° C., preferably from 89 to 103° C., more preferably from 94 to 98° C. A preferred further melting temperature is within a range from 100 to 124° C., preferably from 105 to 119° C., more preferably from 110 to 114° C.

Extrusion

In the extrusion, the polymers are typically heated to temperatures of 210 to 350° C., measured at the molten polymer film beneath the exit from the extruder die. The extrusion can be effected by means of extrusion tools which are known to those skilled in the art and are commercially available, for example extruders, extruder screws, feed blocks, etc. At the end of the extruder, there is preferably an opening through which the polymer melt is pressed. The opening may have any shape that allows extrusion of the polymer melt. For example, the opening may be angular, oval or round. The opening is preferably in the form of a slot of a funnel. Once the melt layer has been applied to the substrate layer by means of the above-described method, the melt layer is left to cool down for the purpose of heat-setting, this cooling preferably being effected by quenching via contact with a surface which is kept at a temperature within a range from 5 to 50° C., especially preferably within a range from 10 to 30° C. Subsequently, at least the flanks are separated off from the surface. The separation may be carried out in any way that is familiar and appears suitable to a person skilled in the art for separating the flanks quickly, as precisely as possible and cleanly. Preferably, the separation is effected by means of a knife, laser beam or waterjet, or a combination of two or more thereof, the use of knives being especially preferable, especially a circular knife.

Lamination

According to the invention, the carrier layer can be overlaid by the barrier layer by lamination. In this case, the prefabricated carrier and barrier layers are joined with the aid of a suitable laminating agent. A preferred laminating agent comprises an intermediate polymer composition from which a polymer interlayer is preferably obtained. In addition, the preferred laminating agent preferably includes the adhesion promoter composition A from which the first adhesion promoter layer is obtained. In this case, the intermediate polymer composition or the adhesion promoter composition A or both are preferably applied by extrusion, more preferably by coextrusion.

Colourant

Useful colourants include both solid and liquid colourants that are known to the person skilled in the art and are suitable for the present invention. According to DIN 55943:2001-10, colourant is the collective term for all colouring substances, especially for dyes and pigments. A preferred colourant is a pigment. A preferred pigment is an organic pigment. Pigments that are notable in connection with the invention are especially the pigments mentioned in DIN 55943:2001-10 and those mentioned in "Industrial Organic Pigments, Third Edition" (Willy Herbst, Klaus Hunger Copyright© 2004 WILEY-VCH Verlag GmbH & Co. KGaA, Weinheim ISBN: 3-527-30576-9). A pigment is a colourant that is preferably insoluble in the application medium. A dye is a colourant that is preferably soluble in the application medium.

Folding of the Sheetlike Composite

The folding of the sheetlike composite is preferably performed in a temperature range from 10 to 50° C., preferably in a range from 15 to 45° C. and especially preferably in a range from 20 to 40° C. This can be achieved by the sheetlike composite being at a temperature in the aforementioned ranges. It is also preferred that a folding tool, preferably together with the sheetlike composite, is at a temperature in the aforementioned range. For this purpose, the folding tool preferably does not have a heating means. Rather, the folding tool or else the sheetlike composite or both may be cooled. It is also preferred that the folding is performed at a temperature of at most 50° C., as "cold folding", and the joining takes place at above 50° C., preferably above 80° C. and especially preferably above 120° C., as "hot sealing". The aforementioned conditions, and especially temperatures, preferably also apply in the environment of the folding, for example in the housing of the folding tool.

"Folding" is understood here as meaning, according to the invention, an operation in which an elongated crease, forming an angle, is made in the folded sheetlike composite, preferably by means of a folding edge of a folding tool. For this purpose, often two adjoining faces of a sheetlike composite are bent increasingly towards one another. The folding produces at least two adjoining fold faces that can then be joined at least in sub-regions to form a container region. According to the invention, the joining can be performed by any measure which appears suitable to the person skilled in the art and which allows for a join that is as gas- and liquid-tight as possible. The joining can be performed by sealing or adhesive bonding or a combination of the two measures. In the case of sealing, the join is created by means of a liquid and the solidification thereof. In the case of adhesive bonding, chemical bonds form between the interfaces or surfaces of the two articles to be joined and create the join. It is often advantageous in the case of sealing or adhesive bonding to press together the faces that are to be sealed or adhesively bonded.

Joining

A useful joining method is any joining method that seems suitable to the person skilled in the art for use of the invention, by means of which a sufficiently firm join can be obtained. A preferred joining method is any selected from the group consisting of sealing, adhesive bonding and pressing, or a combination of at least two of these. In the case of sealing, the join is created by means of a liquid and the solidification thereof. In the case of adhesive bonding, chemical bonds form between the interfaces or surfaces of the two articles to be joined and create the join. It is often advantageous in the case of sealing or adhesive bonding to press together the faces that are to be sealed or adhesively bonded. A preferred pressing method of at least two layers is compression of a first surface of a first of the two layers on to a second surface of the second of the two layers that faces the first surface across at least 20%, preferably at least 30%, more preferably at least 40%, more preferably at least 50%, more preferably at least 60%, more preferably at least 70%, even more preferably at least 80%, even more preferably at least 90%, most preferably at least 95%, of the first surface. A particularly preferred joining method is sealing. A preferred sealing method comprises, as steps, heating, overlaying and pressing, the steps preferably being effected in this sequence. Another sequence is likewise conceivable, especially the sequence of laying, heating and pressing. A preferred heating method is heating of a polymer layer, preferably a thermoplastic layer, more preferably a polyethylene layer or a polypropylene layer or both. A further preferred heating method is heating of a polyethylene layer to a temperature within a range from 80 to 140° C., more preferably from 90 to 130° C., most preferably from 100 to 120° C. A further preferred heating method is heating of a polypropylene layer to a temperature within a range from 120 to 200° C., more preferably from 130 to 180° C., most preferably from 140 to 170° C. A further preferred heating method is effected to a sealing temperature of the polymer layer. A preferred heating method can be effected by means of radiation, by means of hot gas, by means of contact with a hot solid, by means of mechanical vibrations, preferably by means of ultrasound, by convection, or by means of a combination of at least two of these measures. A particularly preferred heating method is effected by inducement of an ultrasound vibration.

Irradiation

In the case of irradiation, any type of radiation suitable to the person skilled in the art for softening of the plastics of the polymer layers present is useful. Preferred types of radiation are IR and UV rays, and microwaves. In the case of the IR rays that are also used for IR welding of sheetlike composites, wavelength ranges of 0.7 to 5 µm should be mentioned. In addition, it is possible to use laser beams within the wavelength range from 0.6 to less than 1.6 µm. In connection with the use of IR rays, these are generated by various suitable sources that are known to the person skilled in the art. Short-wave radiation sources in the range from 1 to 1.6 µm are preferably halogen sources. Medium-wave radiation sources within the range from >1.6 to 3.5 µm are, for example, metal foil sources. Long-wave radiation sources in the range of >3.5 µm that are frequently used are quartz sources. Lasers are being used ever more frequently. For instance, diode lasers within the wavelength range from 0.8 to 1 µm, Nd:YAG lasers at about 1 µm and $CO_2$ lasers at about 10.6 µm are in use. High-frequency techniques with a frequency range from 10 to 45 MHz, frequently within a power range from 0.1 to 100 kW, are also in use.

Ultrasound

In the case of ultrasound, the following treatment parameters are preferred:
P1 a frequency within a range from 5 to 100 kHz, preferably within a range from 10 to 50 kHz and more preferably within a range from 15 to 40 kHz;
P2 an amplitude within a range from 2 to 100 µm, preferably within a range from 5 to 70 µm and particularly preferable within a range from 10 to 50 µm;
P3 an oscillation time (being the period of time within which an oscillation body such as a sonotrode or inductor has a contact oscillation effect on the sheetlike composite) within a range from 50 to 1000 ms, preferably within a range from 100 to 600 ms and particularly preferable within a range from 150 to 300 ms.

In suitable selection of the radiation and oscillation conditions, it is advantageous to take account of the intrinsic resonances of the plastic and to select frequencies close to these.

Contact with a Solid

Heating via contact with a solid can be effected, for example, by means of a heating plate or heating mould in direct contact with the sheetlike composite, which releases the heat to the sheetlike composite.

Hot Gas

The hot gas, preferably hot air, can be directed onto the sheetlike composite by means of suitable blowers, exit openings or nozzles, or a combination of these. Frequently, contact heating and the hot gas are used simultaneously. For example, a holding device for a container precursor formed from the sheetlike composite, through which hot gas flows and which is heated as a result and releases the hot gas through suitable openings, can heat the sheetlike composite through contact with the wall of the holding device and the hot gas. In addition, the container precursor can also be heated by fixing the container precursor with a container precursor holder and directing the flow from one or two or more hot gas nozzles provided in the container precursor holder onto the regions of the container precursor that are to be heated.

Food or Drink Product

In the context of the invention, the sheetlike composite and the container precursor are preferably designed for production of a food or drink product container. In addition, the closed container according to the invention is preferably a food or drink product container. Food and drink products include all kinds of food and drink known to those skilled in the art for human consumption and also animal feeds. Preferred food and drink products are liquid above 5° C., for example milk products, soups, sauces, non-carbonated drinks Container Precursor A container precursor is a precursor of the closed container which arises in the course of production of a closed container. In this context, the container precursor comprises the sheetlike composite preferably in the form of a blank. In this context, the sheetlike composite may be in an unfolded or folded state. A preferred container precursor has been cut to size and is designed for production of a single closed container. A preferred container precursor which has been cut to size and is designed for production of a single closed container is also referred to as a shell or sleeve. In this context, the shell or sleeve comprises the sheetlike composite in folded form. In addition, the container precursor preferably takes the form of an outer shell of a prism. A preferred prism is a cuboid. Moreover, the shell or sleeve comprises a longitudinal seam and is open in a top region and a base region. A typical container precursor which has been cut to size and is designed for production of a multitude of closed containers is often referred to as a tube.

A further preferred container precursor is open, preferably in a top region or a base region, more preferably in both. A preferred container precursor is in the form of a shell or tube or both. A further preferred container precursor comprises the sheetlike composite in such a way that the sheetlike composite has been folded at least once, preferably at least twice, more preferably at least 3 times, most preferably at least 4 times. A preferred container precursor is in one-piece form. More preferably, a base region of the container precursor is in a one-piece design with a lateral region of the container precursor.

Container

The closed container according to the invention may have a multitude of different forms, but preference is given to an essentially cuboidal structure. In addition, the full area of the container may be formed from the sheetlike composite, or it may have a two-part or multipart construction. In the case of a multipart construction, it is conceivable that, as well as the sheetlike composite, other materials are also used, for example plastic, which can be used especially in the top or base regions of the container. In this context, however, it is preferable that the container is formed from the sheetlike composite to an extent of at least 50%, especially preferably to an extent of at least 70% and further preferably to an extent of at least 90% of the area. In addition, the container may have a device for emptying the contents. This may be formed, for example, from a polymer or mixture of polymers and be attached on the outer face of the container. It is also conceivable that this device has been integrated into the container by "direct injection moulding". In a preferred configuration, the container according to the invention has at least one edge, preferably from 4 to 22 or else more edges, especially preferably from 7 to 12 edges. Edges in the context of the present invention are understood to mean regions which arise in the folding of a surface. Examples of edges include the longitudinal contact regions between two wall surfaces of the container in each case, also referred to as longitudinal edges herein. In the container, the container walls are preferably the surfaces of the container framed by the edges. Preferably, the interior of a container according to the invention comprises a food or drink product. Preferably, the closed container does not comprise any lid or base, or either, that has not been formed in one piece with the sheetlike composite. A preferred closed container comprises a food or drink product.

Hole

The at least one hole that is provided in the carrier layer according to preferred embodiments may have any shape that is known to a person skilled in the art and suitable for various closures or drinking straws. In the context of the invention, particular preference is given to a hole for passage of a drinking straw. The holes often have rounded portions in plan view. Thus, the holes may be essentially circular, oval, elliptical or drop-shaped. The shape of the at least one hole in the carrier layer usually also predetermines the shape of the opening that is produced either by an openable closure which is connected to the container and through which the content of the container is dispensed from the container after opening, or by a drinking straw in the container. Consequently, the openings of the opened container often have shapes that are comparable to or even the same as the at least one hole in the carrier layer. Configurations of the sheetlike composite with a single hole primarily serve for letting out the food or drink product located in the container that is produced from the sheetlike composite. A further hole may be provided, especially for letting air into the container while the food or drink product is being let out.

In the context of covering the at least one hole of the carrier layer, it is preferred that the hole-covering layers are at least partly joined to one another, preferably to an extent of at least 30%, preferably at least 70% and especially preferably at least 90%, of the area formed by the at least one hole. It is also preferred that the hole-covering layers are joined to one another at the edges of the at least one hole and preferably lie against the edges in a joined manner, in order in this way to achieve an improved leak-tightness via a join that extends across the entire area of the hole. The hole-covering layers are often joined to one another across the region that is formed by the at least one hole in the carrier layer. This leads to a good leak-tightness of the container formed from the composite, and consequently to a desired long shelf life of the food or drink products kept in the container. Preferably, the at least one hole has a diameter within a range from 3 to 30 mm, more preferably from 3 to 25 mm, more preferably from 3 to 20 mm, more preferably from 3 to 15 mm, most preferably from 3 to 10 mm. In this case, the diameter of the hole is the length of the longest straight line which begins and ends at the edge of the hole and runs through the geometric centre of the hole.

Opening/Opening Aid

The opening of the container is usually brought about by at least partially destroying the hole-covering layers that cover the at least one hole. This destruction can be effected by cutting, pressing into the container or pulling out of the container. The destruction can be effected by means of an opening aid which is joined to the container and is arranged in the region of the at least one hole, usually above the at least one hole, for example also by a drinking straw which is pushed through the hole-covering layers. It is also preferred in a configuration according to the invention that an opening aid is provided in the region of the at least one hole. It is preferred here that the opening aid is provided on the surface area of the composite that represents the outer face of the container. The container also preferably comprises a closure, for example a lid, on the outer face of the container. It is in this case preferred that the closure covers the hole at least partially, preferably completely. Consequently, the closure protects the hole-covering layers, which are less robust in comparison with the regions outside the at least one hole, from damaging mechanical effects. For opening the hole-covering layers that cover the at least one hole, the closure often comprises the opening aid. Suitable as such an opening aid are for example hooks for tearing out at least part of the hole-covering layers, edges or cutting edges for cutting into the hole-covering layers or spikes for puncturing the hole-covering layers, or a combination of at least two of these. These opening aids are often mechanically coupled to a screw lid or a cap of the closure, for example by way of a hinge, so that the opening aids act on the hole-covering layers to open the closed container when the screw lid or the cap is actuated. Closure systems of this kind, comprising composite layers covering a hole, openable closures that cover this hole and have opening aids, are sometimes referred to in the specialist literature as "overcoated holes" with "applied fitments".

Test Methods

The following test methods were used within the context of the invention. Unless stated otherwise, the measurements were conducted at an ambient temperature of 23° C., an ambient air pressure of 100 kPa (0.986 atm) and a relative air humidity of 50%.

Separation of Individual Layers

If the individual layers of a laminate—for example the barrier layer, the outer polymer layer, the inner polymer layer or the polymer interlayer—are to be examined herein, the layer to be examined is first separated from the laminate as described below. Three specimens of the sheetlike composite are cut to size. For this purpose, unless stated otherwise, unfolded and ungrooved regions of the sheetlike composite are used. Unless stated otherwise, the specimens have dimensions of 4 cm×4 cm. Should other dimensions of the layer to be examined be necessary for the examination to be conducted, sufficiently large specimens are cut out of the laminate. The specimens are introduced into an acetic acid bath (30% acetic acid solution: 30% by weight of $CH_3COOH$, remainder to 100% by weight $H_2O$) heated to 60° C. for 30 minutes. This detaches the layers from one another. If required, the layers may also be cautiously manually pulled apart here. Should the desired layer not be sufficiently readily detachable, as an alternative, new specimens are used and these are treated in an ethanol bath (99% ethanol) as described above. If residues of the carrier layer (especially in the case of a cardboard layer as carrier layer) are present on the layer to be examined (for example the outer polymer layer or the polymer interlayer), these are cautiously removed with a brush. One sample of size sufficient for the examination to be conducted (unless stated otherwise, with an area of 4 $cm^2$) is cut out of each of the three films thus prepared. These samples are then stored at 23° C. for 4 hours and hence dried. Subsequently, the three samples can be examined. Unless stated otherwise, the result of the examination is the arithmetic mean of the results for the three samples.

MFR

MFR is measured according to standard ISO 1133-1: 2012, Method A (mass determination method), unless stated otherwise at 190° C. and 2.16 kg.

Density

Density is measured according to standard ISO 1183-1: 2013.

Melting Temperature

Melting temperature is determined according to the DSC method ISO 11357-1, -5. The instrument is calibrated according to the manufacturer's instructions on the basis of the following measurements:

temperature of indium-onset temperature,
heat of fusion of indium,
temperature of zinc-onset temperature.

Oxygen Permeation Rate

Oxygen permeation rate is determined according to standard ASTM D3985-05 (2010). The sample to be examined, unless stated otherwise, is taken from an ungrooved and unfolded region of the laminate. In addition, the sample to be examined is tested with the side facing outward in the laminate facing the test gas. The area of the sample is 50 $cm^2$. The measurements are conducted at an ambient temperature of 23° C., an ambient air pressure of 100 kPa (0.986 atm) and a relative air humidity of 50%. The test instrument is a Ox-Tran 2/22 from Mocon, Neuwied, Germany. The measurement is conducted without compressed air compensation. For the measurements, samples at ambient temperature are used. Further settings and factors that affect the measurement—especially the rest of those listed under point 16 of the standard ASTM D3985-05 (2010)—are defined by the instrument used and the proper use and maintenance thereof according to the manufacturer's handbook.

Viscosity Number of PA

The viscosity number of PA is measured according to the standard DIN EN ISO 307 (2013) in 95% sulfuric acid.

Molecular Weight Distribution

Molecular weight distribution is measured by gel permeation chromatography by means of light scattering: ISO 16014-3/-5 (2009-09).

Moisture Content of Cardboard

The moisture content of the cardboard is measured according to the standard ISO 287:2009.

Adhesion

The adhesion of two adjacent layers is determined by fixing them in a 90° peel test instrument, for example the Instron "German rotating wheel fixture", on a rotatable roller which rotates at 40 mm/min during the measurement. The samples had been cut beforehand into strips 15 mm wide. On one side of the sample, the laminas are detached from one another and the detached end is clamped in a tensile device directed vertically upward. A measuring instrument to determine the tensile force is attached to the tensile device. As the roller rotates, the force needed to separate the laminas from one another is measured. This force corresponds to the adhesion of the layers to one another and is reported in N/15 mm. The separation of the individual layers can be effected mechanically, for example, or by means of a controlled pretreatment, for example by soaking the sample in 30% acetic acid at 60° C. for 3 min.

Detection of Colourants

Detection of organic colourants can be conducted in accordance with the methods described in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9).

Water Vapour Permeation Rate

Water vapour permeation rate is determined according to standard ASTM F1249-13. The sample to be examined, unless stated otherwise, is taken from an ungrooved and unfolded region of the laminate. In addition, the sample to be examined is tested with the side facing inward in the laminate (the side facing the contents of the container) facing the elevated humidity. The measurement area of the sample is 50 cm$^2$. The measurements are conducted at an ambient temperature of 23° C., an ambient air pressure of 100 kPa (0.986 atm) and a relative air humidity of 100% on one side of the sample and of 0% on the other side of the sample. The test instrument is a Permatran—W Model 3/33 from Mocon, Neuwied, Germany. For the measurements, samples at ambient temperature are used. Further settings and factors that affect the measurement—especially the rest of those listed under point 12 of the standard ASTM F1249-13—are defined by the instrument used and the proper use and maintenance thereof according to the manufacturer's handbook.

Layer Thickness

The layer thickness of a sample having an area of 0.5 cm$^2$ was determined by means of a scanning electron microscope (SEM). For this purpose, a cross section through the layer structure to be determined was conducted manually with a blade (Leica Microtome Blades 819). The cross section was sputtered with gold (Cressington 108auto from Cressington Scientific Instruments Ltd., Watford (UK)) and then analysed by SEM (Quanta 450, FEI Deutschland GmbH, Frankfurt) under high vacuum (p<7.0·10$^{-5}$ Pa). The layer thicknesses of the individual layers were ascertained with the "xT Microscope Control" software, version 6.2.11.3381, FEI Company, Frankfurt, Germany. To determine the average thickness, three samples are taken, the layer thickness in each sample is determined as described above, and the arithmetic mean is formed.

Tensile Strength

Tensile strength is determined according to the standard DIN EN ISO 527-3:2003-07.

Tensile Elongation

Tensile elongation is determined according to the standard JIS K 7127:1999.

Modulus of Elasticity

Modulus of elasticity is determined according to the standard DIN EN ISO 527-3:2003-07.

Surface Tension

To determine the surface tension, first of all, the contact angle for wetting with water ("water contact angle") is determined according to the standard ASTM D5946-09. In this case, samples of dimensions 30 mm×35 mm are cut out of the laminate with a scalpel. 10 measurements are conducted on each sample, from which the mean is calculated. Prior to the measurement, the samples are prepared according to section 10.2 of the standard. The test conditions are chosen according to section 10.4. Proceeding from the measured contact angle for water, the surface tension in dyn/cm (dyn/cm =mN/m) is read off from table X2.1 of Annex X2 of the standard. The surface tension should be determined with minimum time delay after the establishment of the surface tension of the corresponding surface.

Proportion of Titanium Oxide

In accordance with the standard DIN EN ISO 186 (08/2002) (in a departure from DIN EN 20 287), specimens of the polymer layer are produced according to the method of sample preparation from the packaging containers or packaging container precursors or laminates to be tested and created in a size of 50 mm×50 mm in size (0.0025 m$^2$) in order to determine the ignition loss. The samples of the polymer layer are weighed and the absolute value is reported in milligrams (mg). The polymer layer samples are subsequently converted to ash according to DIN 54370 (06/2007) by ignition method A at 575° C. for about 3 hours. The ignition residue of every sample is weighed. The absolute value is reported in milligrams (mg). The proportion of titanium oxide in % by weight is calculated as the quotient of ignition residue in milligrams and sample weight prior to ashing in mg·100.

Determination of Luminance (L value in L*a*b* Colour Space)

The L value is determined by means of a Color Touch Model Iso spectrophotometer from Technidyne Corporation (New Albany, Indiana, USA). The light source used is a D65 (UV-rich daylight). The viewing angle is 10°. The measurement program is called "Farbe" for determination of the L*a*b* values. The background chosen for the sample plate is a white surface (L value>86) with minimum dimensions of 75 mm×150 mm. For each laminate to be examined, exactly one sample of the polymer layer to be examined is separated from the laminate as described above. The dimensions of the sample are chosen such that it has the same size as the background. Together with the background, the sample is clamped on the sample plate with the side to be analysed upward and analysed. The sample is measured at 5 different positions. The average is determined from the 5 individual measurements.

Transmittance

Each of the three specimens prepared as described above is placed into a UV-vis spectrometer (Analytik Jena Specord 250 Plus) and analysed. Subsequently, transmittance is determined across a wavelength in the range from 200 to 800 nm with a measuring point separation of 2 nm and a speed of 8 nm/s. In the evaluation, the wavelength range to be examined from this wavelength range (for example from 410 to 475 nm or from 475 to 480 nm) is considered. The transmittance T is:

$$T=(I/I_0)$$

with
$I_0$=light intensity before passing through the sample and
$I$=light intensity after passing through the sample.

The measurement is repeated three times for each specimen and the arithmetic mean is found.

By multiplication of T by 100, the transmittance can also be reported in %.

$D_{50}$ of the Particle Size Distribution

The particle size distribution is determined according to ISO 13320:2009 with the aid of an SALD 7101 particle size analyser from Shimadzu, Duisburg.

Microwave Oven Compatibility

The containers produced and filled as below for the examples and comparative examples are stored at ambient temperature of 23° C. for 5 hours, such that the contents of the container take on the ambient temperature. Then the closed containers are heated in a commercial microwave oven at 900 watts for 2 minutes. Thereafter, the containers are opened, the contents of the container are stirred with a wooden splint and the temperature of the contents of the container is measured with a thermometer. To assess the heating of the contents of the container, the temperature measured is compared to the ambient temperature of 23° C. For each example and comparative example, 5 identical containers are tested as above and the temperature differences attained are arithmetically averaged for the result.

Microwave compatibility is assessed by the following scale:
"−"=contents of container not heated
"+"=contents of container slightly heated
"++"=contents of container strongly heated In addition, in the case of the containers tested that had an aluminium-containing barrier layer, after microwave heating, local damage was apparent in the top region as a result of heating.

Opening Test

The carrier layer was provided with a hole as described below for the examples and comparative examples, to which an opening aid was applied according to EP 1 812 298 B1. According to paragraph [0002], this opens the container with a puncturing and cutting motion through the membrane that covers the hole. In the case of optimal function, about 90% of the membrane radius defined by the cutting ring is cut through, and there is only a connection to the container at one point. The membrane folds away to the side and the product can be poured out without disruption. In the event of material selection not in accordance with the invention, restrictions can arise in the opening of the container. In each case, the symbols mean:
"+" good opening characteristics, and
"−" poor opening characteristics.

Poor opening characteristics can mean high expenditure of force, a membrane that has not been completely cut through, or threads and tongues resulting from stretched polymer layers.

Sensory Analysis

To detect any change in the taste of the contents of the container resulting from storage of the filled container, for each example and each comparative example, 20 identical containers at an ambient temperature of 23° C. were stored under exposure to a Master TL-D Super 80 lamp from Phillips, Eindhoven, the Netherlands, and an illumination intensity of about 1000 lm for 3 months. Subsequently, the milk in each container was subjected to a sensory analysis by means of an assessment test with a scale according to standard DIN 10952; Part 2 (1983). The number of trained test subjects is 10. A scale with k =6 (1 to 6) is used. The scale classification from Table 1 of the standard is used here. In addition, tasting is according to an unspecific assessment scheme (according to Table 2 of the standard). For each example and comparative example, the arithmetic mean from the individual results for the 20 containers is formed for the overall result. The scale cited above is reproduced below. The stated expectations are always based on unexposed and unstored containers as reference.

6—complete, full fulfilment of expectations,
5—slight deviations
4—noticeable deviations
3—distinct defects
2—significant defects
1—completely changed (not assessable)

Metal Content

For the assessment of the metal contents of the laminates in the examples and comparative examples, the following scale was used:
"−"=very high proportion by weight of aluminium;
"+"=low proportion by weight of aluminium;
"++"=no aluminium.

The invention is described in more detail hereinafter by examples and drawings, wherein the examples and drawings do not imply any restriction of the invention. Also, unless otherwise indicated, the drawings are not to scale.

Laminate Construction

For the examples (inventive) and comparative examples (noninventive), laminates with the layer constructions and layer sequences specified in Tables 1 to 14 and 18 and 19 below were each prepared by layer extrusion methods.

Comparative Example 1 (Noninventive)

TABLE 1

| Construction of the laminate according to Comparative Example 1 | | |
|---|---|---|
| Layer designation | Material | Basis weight [g/m²] |
| Outer polymer layer | LDPE 23F430 from Ineos GmbH, Cologne, Germany | 15 |
| Carrier layer | Cardboard: Stora Enso Natura T Duplex double coating slip, Scott bond 200 J/m², residual moisture content 7.5% | 210 |

TABLE 1-continued

Construction of the laminate according to Comparative Example 1

| Layer designation | Material | Basis weight [g/m²] |
|---|---|---|
| Polymer interlayer | LDPE 23L430 from Ineos GmbH, Cologne, Germany | 18 |
| First Adhesion promoter layer | Escor 6000 HSC from Exxon Mobil Corporation as adhesion promoter polymer A | 3 |
| Barrier layer | Aluminium foil, EN AW 8079 from Hydro Aluminium Deutschland GmbH | here: thickness 9 μm |
| Further Adhesion promoter layer | Co-extrudate (1) Escor 6000 HSC from Exxon Mobil Corporation as adhesion promoter polymer B, and (2) LDPE 19N430 from Ineos GmbH, Cologne, Germany | (1) - 4 (2) - 22 |
| Inner polymer layer | Blend of (1) 65% by weight of LDPE 19N430 from Ineos GmbH, Cologne, Germany and (2) 35% by weight of Eltex 1315 AZ from Ineos GmbH, Cologne, Germany | 10 |

Comparative Example 2 (Noninventive)

TABLE 2

Construction of the laminate according to Comparative Example 2

| Layer designation | | Material | Basis weight [g/m²] |
|---|---|---|---|
| Outer polymer layer | | LDPE 19N430 from Ineos GmbH, Cologne, Germany | 15 |
| Carrier layer | | Cardboard: Stora Enso Natura T Duplex double coating slip, Scott bond 200 J/m², residual moisture content 7.5% | 210 |
| Polymer interlayer | | LDPE 19N430 from Ineos GmbH, Cologne, Germany | 18 |
| First Adhesion promoter layer | | Dow XZ89893 ethylene-ethyl acrylate copolymer from The Dow Chemical Company AG | 2 |
| Barrier layer[1] | Barrier substrate layer | BOPET | thickness 12 μm |
| | Barrier material layer | AlOx | |
| | | Protective layer | |
| Further Adhesion promoter layer | | Dow XZ89893 ethylene-ethyl acrylate copolymer from The Dow Chemical Company AG | 3 |
| Inner polymer layer | | LDPE 19N430 from Ineos GmbH, Cologne, Germany | 20 |
| | | Blend of (1) 65% by weight of LDPE 19N430 from Ineos GmbH, Cologne, Germany and (2) 35% by weight of Eltex 1315 AZ from Ineos GmbH, Cologne, Germany | 10 |

([1]available as GL-AE ■ C-FD from Toppan Printing Co. Ltd.)

Comparative Example 3 (Noninventive)

TABLE 3

Construction of the laminate according to Comparative Example 3

| Layer designation | Material | Basis weight [g/m²] |
|---|---|---|
| Outer polymer layer | FDPE 23L430 from Ineos GmbH, Cologne, Germany | 15 |
| Carrier layer | Cardboard: Stora Enso Natura | 210 |

TABLE 3-continued

Construction of the laminate according to Comparative Example 3

| Layer designation | | Material | Basis weight [g/m$^2$] |
|---|---|---|---|
| | | T Duplex double coating slip, Scott bond 200 J/m$^2$, residual moisture content 7.5% | |
| Polymer interlayer | | LDPE 23L430 from Ineos GmbH, Cologne, Germany | 18 |
| First Adhesion promoter layer | | Dow XZ89893 ethylene-ethyl acrylate copolymer from The Dow Chemical Company AG | 2 |
| Barrier layer[2] | Barrier substrate layer | BOPP | |
| | Barrier material layer | SiOx | |
| | | Protective layer | |
| Further Adhesion promoter layer | | Dow XZ89893 ethylene-ethyl acrylate copolymer from The Dow Chemical Company AG | 3 |
| Inner polymer layer | | LDPE 19N430 from Ineos GmbH, Cologne, Germany | 20 |
| | | Blend of (1) 65% by weight of LDPE 19N430 from Ineos GmbH, Cologne, Germany and (2) 35% by weight of Eltex 1315 AZ from Ineos GmbH, Cologne, Germany | 10 |

([2]available as Ceramis, Amcor, Singen, Germany)

Examples and comparative examples for examination of the outer polymer layer:

In Examples 1 to 6 and Comparative Examples 4 to 7, the effect of the L value of the outer polymer layer on the properties of the laminate was examined. For Comparative Examples 4 and 5 and Examples 1 to 3, laminates with layers and layer sequences as in Tables 4 and 5 below were used.

TABLE 4

Construction of the laminates according to Comparative Examples 4 and 5 and Examples 1 to 3

| Layer designation | | Material | Basis weight [g/m$^2$] |
|---|---|---|---|
| Outer polymer layer | | see Table 5 | 16 |
| Carrier layer | | Cardboard: Stora Enso Natura T Duplex double coating slip, Scott bond 200 J/m$^2$, residual moisture content 7.5% | 210 |
| Polymer interlayer | | LDPE 19N430 from Ineos GmbH, Cologne, Germany | 18 |
| First Adhesion promoter layer | | Dow XZ89893 ethylene-ethyl acrylate copolymer from The Dow Chemical Company AG | 2 |
| Barrier layer[1] | Barrier substrate layer | BOPET | thickness 12 μm |
| | Barrier material layer | AlOx | |
| | | Protective layer | |
| Further Adhesion promoter layer | | Dow XZ89893 ethylene-ethyl acrylate copolymer from The Dow Chemical Company AG | 3 |
| Inner polymer layer | | LDPE 19N430 from Ineos GmbH, Cologne, Germany | 20 |
| | | Blend of (1) 65% by weight of LDPE 19N430 from Ineos GmbH, Cologne, Germany and (2) 35% by weight of Eltex 1315 AZ from Ineos GmbH, Cologne, Germany | 10 |

([1]available as GL-AE ■ C-FD from Toppan Printing Co. Ltd.)

TABLE 5

Figures for the composition of the outer polymer layers of Comparative Examples 4 and 5 and Examples 1 to 3

|  | Proportion of LDPE 19N430 from Ineos GmbH, Cologne, Germany [% by wt.] | Proportion of Polyblak ® PC 1423 from A. Schulman Inc. [% by wt.] | Proportion of Polywhite ® PC 8163 from A. Schulman Inc. [% by wt.] |
|---|---|---|---|
| Comparative Example 4 | 93 | 5 | 2 |
| Comparative Example 5 | 44 | 1 | 55 |
| Example 1 | 67 | 5 | 28 |
| Example 2 | 71 | 4 | 25 |
| Example 3 | 66 | 4 | 30 |

For Comparative Examples 6 and 7 and Examples 4 to 6, laminates with layers and layer sequences as in Tables 6 and 7 below were used.

TABLE 6

Construction of the laminates according to Comparative Examples 6 and 7 and Examples 4 to 6

| Layer designation | | Material | Basis weight [g/m²] |
|---|---|---|---|
| Outer polymer layer | | see Table 7 | 16 |
| Carrier layer | | Cardboard: Stora Enso Natura T Duplex double coating slip, Scott bond 200 J/m², residual moisture content 7.5% | 210 |
| Polymer interlayer | | LDPE 23L430 from Ineos GmbH, Cologne, Germany | 18 |
| First Adhesion promoter layer | | Dow XZ89893 ethylene-ethyl acrylate copolymer from The Dow Chemical Company AG | 2 |
| Barrier layer[2] | Barrier substrate layer | BOPP | |
| | Barrier material layer | SiOx | |
| | | Protective layer | |
| Further Adhesion promoter layer | | Dow XZ89893 ethylene-ethyl acrylate copolymer from The Dow Chemical Company AG | 3 |
| Inner polymer layer | | LDPE 19N430 from Ineos GmbH, Cologne, Germany | 20 |
| | | Blend of (1) 65% by weight of LDPE 19N430 from Ineos GmbH, Cologne, Germany and (2) 35% by weight of Eltex 1315 AZ from Ineos GmbH, Cologne, Germany | 10 |

([2]available as Ceramis, Amcor, Singen, Germany)

TABLE 7

Figures for the outer polymer layer of Comparative Examples 6 and 7 and Examples 4 to 6

|  | Proportion of LDPE 23L430 from Ineos GmbH, Cologne, Germany [% by wt.] | Proportion of Polyblak ® PC 1423 from A. Schulman Inc. [% by wt.] | Proportion of Polywhite ® PC 8163 from A. Schulman Inc. [% by wt.] |
|---|---|---|---|
| Comparative Example 6 | 93 | 5 | 2 |
| Comparative Example 7 | 44 | 1 | 55 |

TABLE 7-continued

Figures for the outer polymer layer of Comparative Examples 6 and 7 and Examples 4 to 6

| | Proportion of LDPE 23L430 from Ineos GmbH, Cologne, Germany [% by wt.] | Proportion of Polyblak® PC 1423 from A. Schulman Inc. [% by wt.] | Proportion of Polywhite® PC 8163 from A. Schulman Inc. [% by wt.] |
|---|---|---|---|
| Example 4 | 67 | 5 | 28 |
| Example 5 | 71 | 4 | 25 |
| Example 6 | 66 | 4 | 30 |

Examples and comparative examples for examination of the polymer interlayer:

In Examples 7 to 12 and Comparative Examples 8 to 11, the effect of the L value of the polymer interlayer on the properties of the laminate was examined. For Comparative Examples 8 and 9 and Examples 7 to 9, laminates with layers and layer sequences as in Tables 8 and 9 below were used.

TABLE 8

Construction of the laminates according to Comparative Examples 8 and 9 and Examples 7 to 9

| Layer designation | | Material | Basis weight [g/m$^2$] |
|---|---|---|---|
| Outer polymer layer | | LDPE 19N430 from Ineos GmbH, Cologne, Germany | 15 |
| Carrier layer | | Cardboard: Stora Enso Natura T Duplex double coating slip, Scott bond 200 J/m$^2$, residual moisture content 7.5% | 210 |
| Polymer interlayer | | see Table 9 | 20 |
| First Adhesion promoter layer | | Dow XZ89893 ethylene-ethyl acrylate copolymer from The Dow Chemical Company AG | 2 |
| Barrier layer[1] | Barrier substrate layer | BOPET | thickness 12 μm |
| | Barrier material layer | AlOx | |
| | | Protective layer | |
| Further Adhesion promoter layer | | Dow XZ89893 ethylene-ethyl acrylate copolymer from The Dow Chemical Company AG | 3 |
| Inner polymer layer | | LDPE 19N430 from Ineos GmbH, Cologne, Germany | 20 |
| | | Blend of (1) 65% by weight of LDPE 19N430 from Ineos GmbH, Cologne, Germany and (2) 35% by weight of Eltex 1315 AZ from Ineos GmbH, Cologne, Germany | 10 |

([1]available as GL-AE ■ C-FD from Toppan Printing Co. Ltd.)

TABLE 9

Figures for the composition of the polymer interlayers of Comparative Examples 8 and 9 and Examples 7 to 9

| | Proportion of LDPE 19N430 from Ineos GmbH, Cologne, Germany [% by wt.] | Proportion of Polyblak® PC 1423 from A. Schulman Inc. [% by wt.] | Proportion of Polywhite® PC 8163 from A. Schulman Inc. [% by wt.] |
|---|---|---|---|
| Comparative Example 8 | 93 | 5 | 2 |
| Comparative Example 9 | 44 | 1 | 55 |
| Example 7 | 67 | 5 | 28 |
| Example 8 | 71 | 4 | 25 |
| Example 9 | 66 | 4 | 30 |

For Comparative Examples 10 and 11 and Examples 10 to 12, laminates with layers and layer sequences as in Tables 10 and 11 below were used.

TABLE 10

Construction of the laminates according to Comparative Examples 10 and 11 and Examples 10 to 12

| Layer designation | | Material | Basis weight [g/m$^2$] |
|---|---|---|---|
| Outer polymer layer | | LDPE 23L430 from Ineos GmbH, Cologne, Germany | 15 |
| Carrier layer | | Cardboard: Stora Enso Natura T Duplex double coating slip, Scott bond 200 J/m$^2$, residual moisture content 7.5% | 210 |
| Polymer interlayer | | see Table 11 | 20 |
| First Adhesion promoter layer | | Dow XZ89893 ethylene-ethyl acrylate copolymer from The Dow Chemical Company AG | 2 |
| Barrier layer[2] | Barrier substrate layer | BOPP | |
| | Barrier material layer | SiOx | |
| | | Protective layer | |
| Further Adhesion promoter layer | | Dow XZ89893 ethylene-ethyl acrylate copolymer from The Dow Chemical Company AG | 3 |
| Inner polymer layer | | LDPE 19N430 from Ineos GmbH, Cologne, Germany | 20 |
| | | Blend of (1) 65% by weight of LDPE 19N430 from Ineos GmbH, Cologne, Germany and (2) 35% by weight of Eltex 1315 AZ from Ineos GmbH, Cologne, Germany | 10 |

([2]available as Ceramis, Amcor, Singen, Germany)

TABLE 11

Figures for the composition of the polymer interlayer of Comparative Examples 10 and 11 and Examples 10 to 12

| | Proportion of LDPE 23L430 from Ineos GmbH, Cologne, Germany [% by wt.] | Proportion of Polyblak® PC 1423 from A. Schulman Inc. [% by wt.] | Proportion of Polywhite® PC 8163 from A. Schulman Inc. [% by wt.] |
|---|---|---|---|
| Comparative Example 10 | 93 | 5 | 2 |
| Comparative Example 11 | 44 | 1 | 55 |
| Example 10 | 67 | 5 | 28 |
| Example 11 | 71 | 4 | 25 |
| Example 12 | 66 | 4 | 30 |

Examples and comparative examples for examination of the inner polymer layer:

In Examples 13 to 18 and Comparative Examples 12 and 13, the effect of the L value of the inner polymer layer on the properties of the laminate was examined. For Comparative Examples 12 and 13 and Examples 13 to 15, laminates with layers and layer sequences as in Tables 12 and 13 below were used.

TABLE 12

Construction of the laminates according to Comparative Examples 12 and 13 and Examples 13 to 15

| Layer designation | | Material | Basis weight [g/m²] |
|---|---|---|---|
| Outer polymer layer | | LDPE 19N430 from Ineos GmbH, Cologne, Germany | 15 |
| Carrier layer | | Cardboard: Stora Enso Natura T Duplex double coating slip, Scott bond 200 J/m², residual moisture content 7.5% | 210 |
| Polymer interlayer | | LDPE 19N430 from Ineos GmbH, Cologne, Germany | 18 |
| First Adhesion promoter layer | | Dow XZ89893 ethylene-ethyl acrylate copolymer from The Dow Chemical Company AG | 2 |
| Barrier layer[1] | Barrier substrate layer | BOPET | thickness 12 μm |
| | Barrier material layer | AlOx | |
| | | Protective layer | |
| Further Adhesion promoter layer | | Dow XZ89893 ethylene-ethyl acrylate copolymer from The Dow Chemical Company AG | 3 |
| Inner polymer layer | First sublayer | see Table 13 | 22 |
| | Second sublayer | Blend of (1) 65% by weight of LDPE 19N430 from Ineos GmbH, Cologne, Germany and (2) 35% by weight of Eltex 1315 AZ from Ineos GmbH, Cologne, Germany | 10 |

([1]available as GL-AE ■ C-FD from Toppan Printing Co. Ltd.)

TABLE 13

Figures for the composition of the first sublayer of the inner polymer layer of Comparative Examples 12 and 13 and Examples 13 to 15

| | Proportion of LDPE 19N430 from Ineos GmbH, Cologne, Germany [% by wt.] | Proportion of Polyblak® PC 1423 from A. Schulman Inc. [% by wt.] | Proportion of Polywhite® PC 8163 from A. Schulman Inc. [% by wt.] |
|---|---|---|---|
| Comparative Example 12 | 93 | 5 | 2 |
| Comparative Example 13 | 44 | 1 | 55 |
| Example 13 | 67 | 5 | 28 |
| Example 14 | 71 | 4 | 25 |
| Example 15 | 66 | 4 | 30 |

For Comparative Examples 14 and 15 and Examples 16 to 18, laminates with layers and layer sequences as in Tables 14 and 15 below were used.

TABLE 14

Construction of the laminates according to Comparative Examples 14 and 15 and Examples 16 to 18

| Layer designation | Material | Basis weight [g/m²] |
|---|---|---|
| Outer polymer layer | LDPE 23L430 from Ineos GmbH, Cologne, Germany | 15 |
| Carrier layer | Cardboard: Stora Enso Natura T Duplex double coating slip, Scott bond 200 J/m², residual moisture content 7.5% | 210 |

TABLE 14-continued

Construction of the laminates according to Comparative Examples 14 and 15 and Examples 16 to 18

| Layer designation | | Material | Basis weight [g/m²] |
|---|---|---|---|
| Polymer interlayer | | LDPE 23L430 from Ineos GmbH, Cologne, Germany | 18 |
| First Adhesion promoter layer | | Dow XZ89893 ethylene-ethyl acrylate copolymer from The Dow Chemical Company AG | 2 |
| Barrier layer[2] | Barrier substrate layer | BOPP | |
| | Barrier material layer | SiOx | |
| | | Protective layer | |
| Further Adhesion promoter layer | | Dow XZ89893 ethylene-ethyl acrylate copolymer from The Dow Chemical Company AG | 3 |
| Inner polymer layer | First sublayer | see Table 15 | 22 |
| | Second sublayer | Blend of (1) 65% by weight of LDPE 19N430 from Ineos GmbH, Cologne, Germany and (2) 35% by weight of Eltex 1315 AZ from Ineos GmbH, Cologne, Germany | 10 |

([2]available as Ceramis, Amcor, Singen, Germany)

TABLE 15

Figures for the composition of the first sublayer of the inner polymer layers of Comparative Examples 14 and 15 and Examples 16 to 18

| | Proportion of LDPE 19N430 from Ineos GmbH, Cologne, Germany [% by wt.] | Proportion of Polyblak® PC 1423 from A. Schulman Inc. [% by wt.] | Proportion of Polywhite® PC 8163 from A. Schulman Inc. [% by wt.] |
|---|---|---|---|
| Comparative Example 14 | 93 | 5 | 2 |
| Comparative Example 15 | 44 | 1 | 55 |
| Example 16 | 67 | 5 | 28 |
| Example 17 | 71 | 4 | 25 |
| Example 18 | 66 | 4 | 30 |

Laminate Production

The carrier layer used throughout the above examples and comparative examples (cardboard: Stora Enso Natura T Duplex double coating slip, Scott bond 200 J/m², residual moisture content 7.5%) has a transmittance of 1.1% for the wavelength range from 475 to 480 nm.

The laminates are produced with an extrusion coating system from Davis Standard. Here, the extrusion temperature is within a range from about 280 to 330° C. Deviations in the temperatures of ±6° C. are within the normal tolerance. Deviations in the basis weights of ±3 g/m² are within the normal tolerance. In the first step, the carrier layer is provided with a hole for each container to be produced and then the outer polymer layer is applied to the carrier layer. In the second step, the barrier layer is applied together with the first adhesion promoter layer and the polymer interlayer to the carrier layer that has been coated with the outer polymer layer beforehand. This second step is effected by lamination. The barrier film to be laminated, immediately prior to lamination, is subjected to surface treatment on both sides in order to increase the surface tension. The surface treatment is effected with an AVE-250E instrument from AFS Entwicklungs- and Vertriebs GmbH, Germany. The input power and the voltage of the surface treatment to be conducted in the form of a corona treatment are chosen so as to give a surface tension of the barrier layer on both sides of 55 dyn/cm (=$10^{-3}$ N/m) directly after the corona treatment. Subsequently, the further adhesion promoter layer and the inner polymer layer are co-extruded onto the barrier layer. For application of the individual layers by extrusion, the polymers are melted in an extruder. The above-specified batches comprising titanium dioxide and carbon black particles (Polywhite® PC 8163 and Polyblak® PC 1423), according to the above figures for the layer compositions, are introduced into the extruder as well for melting of the polymer components and mixing. In the case of application of a polymer in a layer, the resultant melt is transferred via a feed block into a nozzle and extruded onto the carrier layer. The laminates produced as described above, prior to further processing, are stored under ambient conditions (ambient temperature of 23° C., ambient air pressure of 100 kPa =0.986 atm, relative air humidity of 50%) for 3 days.

Container Production

Grooves, especially longitudinal grooves, were introduced into the laminates obtained as described above on the outside (side of the outer polymer layer). In addition, the grooved laminate was divided into blanks for individual containers, each blank including one of the above holes. By folding along the 4 longitudinal grooves of each and every blank and sealing of overlapping fold faces by introduction of heat, a shell-shaped container precursor of the shape shown in FIG. 3 with a longitudinal seam was obtained in each case. This shell was used to produce a closed container of the shape (brick type) shown in FIG. 4 in a CFA 712 standard filling machine, SIG Combibloc, Linnich. This involved producing a base region by folding and closing by heat-sealing. This gave rise to a beaker that was open at the top. The beaker was sterilized with hydrogen peroxide. In addition, the beaker was filled with UHT milk having a fat content of 1.5%. By folding and ultrasound sealing, the top region of the beaker, which includes the hole, was closed and hence a closed container was obtained. An opening aid of the type disclosed in EP 1 812 298 B1 was glued to this container over the hole with a Euromelt 510 adhesive from Henkel, Dusseldorf. After the adhesive had cured, identical containers in each case were examined by the above test methods with regard to the properties specified in the evaluations below.

TABLE 16

Evaluation of the studies in respect of the L value of the outer polymer layer
Evaluation in respect of the L value of the outer polymer layer

|  | L value Outer polymer layer | Metal content of the laminate | Microwave oven compatibility | Opening test | Establishment of sealing face activation | Sensory analysis |
|---|---|---|---|---|---|---|
| Comparative Example 1 | 90 | − | − | − | + | 5.5 |
| Comparative Example 2 | 90 | + | + | − | − | 1.2 |
| Comparative Example 3 | 90 | ++ | ++ | − | − | 1.3 |
| Comparative Example 4 | 28 | + | + | + | + | 2.0 |
| Comparative Example 5 | 58 | + | + | + | + | 2.1 |
| Comparative Example 6 | 28 | ++ | ++ | + | + | 2.1 |
| Comparative Example 7 | 58 | ++ | ++ | + | + | 2.3 |
| Example 1 | 30 | + | + | + | + | 5.0 |
| Example 2 | 44 | + | + | + | + | 5.5 |
| Example 3 | 56 | + | + | + | + | 5.2 |
| Example 4 | 30 | ++ | ++ | + | + | 5.0 |
| Example 5 | 44 | ++ | ++ | + | + | 5.4 |
| Example 6 | 56 | ++ | ++ | + | + | 5.2 |

TABLE 17

Evaluation of the studies in respect of the L value of the polymer interlayer
Evaluation in respect of the L value of the polymer interlayer

|  | L value Polymer interlayer | Metal content of the laminate | Microwave oven compatibility | Opening test | Establishment of sealing face activation | Sensory analysis |
|---|---|---|---|---|---|---|
| Comparative Example 1 | 90 | − | − | − | + | 5.5 |
| Comparative Example 2 | 90 | + | + | − | − | 1.2 |
| Comparative Example 3 | 90 | ++ | ++ | − | − | 1.3 |
| Comparative Example 8 | 28 | + | + | + | + | 2.0 |
| Comparative Example 9 | 58 | + | + | + | + | 2.1 |
| Comparative Example 10 | 28 | ++ | ++ | + | + | 2.1 |
| Comparative Example 11 | 58 | ++ | ++ | + | + | 2.3 |
| Example 7 | 30 | + | + | + | + | 5.0 |
| Example 8 | 44 | + | + | + | + | 5.5 |
| Example 9 | 56 | + | + | + | + | 5.2 |
| Example 10 | 30 | ++ | ++ | + | + | 5.0 |
| Example 11 | 44 | ++ | ++ | + | + | 5.4 |
| Example 12 | 56 | ++ | ++ | + | + | 5.2 |

TABLE 18

Evaluation of the studies in respect of the L value of the inner polymer layer
Evaluation in respect of the L value of the inner polymer layer

| | L value Inner polymer layer | Metal content of the laminate | Microwave oven compatibility | Opening test | Establishment of sealing face activation | Sensory analysis |
|---|---|---|---|---|---|---|
| Comparative Example 1 | 90 | − | − | − | + | 5.5 |
| Comparative Example 2 | 90 | + | + | − | − | 1.2 |
| Comparative Example 3 | 90 | ++ | ++ | − | − | 1.3 |
| Comparative Example 12 | 28 | + | + | + | + | 2.0 |
| Comparative Example 13 | 58 | + | + | + | + | 2.2 |
| Comparative Example 14 | 28 | ++ | ++ | + | + | 2.2 |
| Comparative Example 15 | 58 | ++ | ++ | + | + | 2.2 |
| Example 13 | 30 | + | + | + | + | 5.0 |
| Example 14 | 44 | + | + | + | + | 5.6 |
| Example 15 | 56 | + | + | + | + | 5.1 |
| Example 16 | 30 | ++ | ++ | + | + | 5.2 |
| Example 17 | 44 | ++ | ++ | + | + | 5.6 |
| Example 18 | 56 | ++ | ++ | + | + | 5.3 |

As described above, in the examples and comparative examples, the base region of the containers was closed by heat sealing. This sealing is effected by a sealing tool which introduces the heat into the laminate by means of hot air. Prior to this sealing, the faces to be sealed are first preactivated in order to achieve optimal sealing characteristics of the inner polymer layer. This preactivation is effected by blowing the inside (side of the inner polymer layer) of the sealing faces with hot air at an accurately defined temperature. This activation temperature has to be matched accurately to the laminate in order to assure optimal preactivation for the subsequent sealing. In order to assess whether the correct faces of the laminate have been sufficiently preactivated, i.e. the optimal hot air temperature has been established, the inside of the laminate is inspected by the naked eye. The temperature of the hot air is adjusted gradually by a few test runs. The "Establishment of sealing face activation" column in the above Tables 15 to 17 is based on how easily it is possible to assess the preactivation by viewing the inside of the laminate with the naked eye and hence to find the optimal preactivation temperature. A "+" here means that the optimal preactivation temperature can be found more easily than in the case of a "−".

As shown by the study results summarized in Tables 16 to 18, the laminates of the invention are suitable for producing containers having a minimum metal content. A need for containers having a minimum metal content exists for numerous reasons. Mention should be made here, for example, of environmental reasons. For instance, metal-containing laminates are more difficult to recycle and more energy-intensive to produce. Moreover, aluminium in particular is now being regarded as disadvantageous to health. Moreover, the container weight with the same contents increases with the metal content of the laminate, which leads to elevated expenditure and costs for the transport of the containers. It is additionally apparent from Table 16 to 18 that it is possible in accordance with the invention to provide laminates from which low-metal containers can be manufactured, which are suitable for heating in a microwave oven, which exhibit good opening characteristics and in which UHT milk can at the same time be stored with minimum impairment of taste. This combination of advantages was not achievable with any laminate from the comparative examples. Moreover, the use of the laminates according to the invention as elucidated above facilitates the establishment of sealing face activation in the container production process.

Further examples and comparative examples for examination of containers to be opened with drinking straws:

In the further comparative examples a to j and the further inventive examples a to h, the possibility of providing, in the context of the invention, improved containers that are easily opened with a drinking straw and are suitable for use in a microwave oven was examined. For these further examples and comparative examples, laminates with layers and layer sequences according to Tables 19 to 23 were used. The laminates and containers were produced as described above for Examples 1 to 18. In a departure from this, in comparative examples a, c and g, no hole was introduced into the carrier layer, nor was any opening aid applied to the closed container. In comparative examples b, d to f, and g to j, and in inventive examples a to h, one circular hole having a diameter of 6 mm was punched into the carrier layer of each container. Later on in the laminate production process, this hole was covered with all other layers of the laminate as hole-covering layers. In the container production, in addition, in a departure from the above examples and comparative examples, no opening aid and no lid over the hole were provided. Instead, the hole with the hole-covering layers was left freely accessible from the outside, such that the hole-covering layers can be punctured in the hole with a plastic drinking straw of external diameter 5 mm that tapers to a point at its lower end, in order thus to open the container. The containers without a hole in the carrier layer cannot be opened with such a drinking straw.

TABLE 19

Construction of the laminates according to the further Comparative Examples a and b

| Layer designation | Material | Basis weight [g/m$^2$] |
|---|---|---|
| Outer polymer layer | LDPE 19N430 from Ineos GmbH, Cologne, Germany | 15 |
| Carrier layer | see Table 22 | |
| Polymer interlayer | see Table 23 | 17 |
| First Adhesion promoter layer | Escor 6000 HSC von Exxon Mobil Corporation | 3 |
| Barrier layer | Aluminium foil, EN AW 8079 from Hydro Aluminium Deutschland GmbH | here: thickness 9 μm |
| Further Adhesion promoter layer | Escor 6000 HSC from Exxon Mobil Corporation as adhesion promoter polymer A | 3 |
| Inner polymer layer | LDPE 19N430 from Ineos GmbH, Cologne, Germany | 20 |
| | Blend of (1) 65% by weight of LDPE 19N430 from Ineos GmbH, Cologne, Germany and (2) 35% by weight of Eltex 1315 AZ from Ineos GmbH, Cologne, Germany | 10 |

TABLE 20

Construction of the laminates according to the further Comparative Examples c to f and the further Examples a to d

| Layer designation | | Material | Basis weight [g/m$^2$] |
|---|---|---|---|
| Outer polymer layer | | LDPE 19N430 from Ineos GmbH, Cologne, Germany | 15 |
| Carrier layer | | see Table 22 | |
| Polymer interlayer | | see Table 23 | 18 |
| First Adhesion promoter layer | | Dow XZ89893 ethylene-ethyl acrylate copolymer from The Dow Chemical Company AG | 2 |
| Barrier layer[1] | Barrier substrate layer | BOPET | thickness 12 μm |
| | Barrier material layer | AlOx | |
| | | Protective layer | |
| Further Adhesion promoter layer | | Dow XZ89893 ethylene-ethyl acrylate copolymer from The Dow Chemical Company AG | 3 |
| Inner polymer layer | | LDPE 19N430 from Ineos GmbH, Cologne, Germany | 20 |
| | | Blend of (1) 65% by weight of LDPE 19N430 from Ineos GmbH, Cologne, Germany and (2) 35% by weight of Eltex 1315 AZ from Ineos GmbH, Cologne, Germany | 10 |

([1]available as GL-AE ■ C-FD from Toppan Printing Co. Ltd.)

TABLE 21

Construction of the laminates according to the further Comparative Examples g and j and further Examples e to h

| Layer designation | | Material | Basis weight [g/m²] |
|---|---|---|---|
| Outer polymer layer | | LDPE 23L430 from Ineos GmbH, Cologne, Germany | 15 |
| Carrier layer | | see Table 22 | |
| Polymer interlayer | | see Table 23 | 18 |
| First Adhesion promoter layer | | Dow XZ89893 ethylene-ethyl acrylate copolymer from The Dow Chemical Company AG | 2 |
| Barrier layer[2] | Barrier substrate layer | BOPP | |
| | Barrier material layer | SiOx | |
| | Protective layer | | |
| Further Adhesion promoter layer | | Dow XZ89893 ethylene-ethyl acrylate copolymer from The Dow Chemical Company AG | 3 |
| Inner polymer layer | | LDPE 19N430 from Ineos GmbH, Cologne, Germany | 20 |
| | | Blend of (1) 65% by weight of LDPE 19N430 from Ineos GmbH, Cologne, Germany and (2) 35% by weight of Eltex 1315 AZ from Ineos GmbH, Cologne, Germany | 10 |

([2]available as Ceramis, Amcor, Singen, Germany)

TABLE 22

Details of the carrier layer in the further Comparative Examples a to j and the further Inventive Examples a to h

| | Material | Drinking straw hole | Transmittance in the wavelength range of 475 to 480 nm [%] |
|---|---|---|---|
| Comparative Example a | Cardboard: Korsnaes Liquid FC, Scott bond 160 J/m², residual moisture content 7.5% | no | 0.1 |
| Comparative Example b | Cardboard: Korsnaes Liquid FC, Scott bond 160 J/m², residual moisture content 7.5% | yes | 0.1 |
| Comparative Example c | Cardboard: Korsnaes Liquid FC, Scott bond 160 J/m², residual moisture content 7.5% | no | 0.1 |
| Comparative Example d | Cardboard: Korsnaes Liquid FC, Scott bond 160 J/m², residual moisture content 7.5% | yes | 0.1 |
| Comparative Example e | Cardboard: Korsnaes Liquid FC, Scott bond 160 J/m², residual moisture content 7.5% | yes | 0.1 |
| Comparative Example f | Cardboard: Korsnaes Liquid FC, Scott bond 160 J/m², residual moisture content 7.5% | yes | 0.1 |
| Comparative Example g | Cardboard: Korsnaes Liquid FC, Scott bond 160 J/m², residual moisture content 7.5% | no | 0.1 |
| Comparative Example h | Cardboard: Korsnaes Liquid FC, Scott bond 160 J/m², residual moisture content 7.5% | yes | 0.1 |
| Comparative Example i | Cardboard: Korsnaes Liquid FC, Scott bond 160 J/m², residual moisture content 7.5% | yes | 0.1 |
| Comparative Example j | Cardboard: Korsnaes Liquid FC, Scott bond 160 J/m², residual moisture content 7.5% | yes | 0.1 |
| Example a | Cardboard: Korsnaes Liquid FC, Scott bond 160 J/m², residual moisture content 7.5% | yes | 0.1 |
| Example b | Cardboard: Korsnaes Liquid FC, Scott bond 160 J/m², residual moisture content 7.5% | yes | 0.1 |

TABLE 22-continued

Details of the carrier layer in the further Comparative Examples a to j and the further Inventive Examples a to h

|  | Material | Drinking straw hole | Transmittance in the wavelength range of 475 to 480 nm [%] |
|---|---|---|---|
| Example c | Cardboard: Korsnaes Liquid FC, Scott bond 160 J/m², residual moisture content 7.5% | yes | 0.1 |
| Example d | Cardboard: Stora Enso Natura T Duplex double coating slip, Scott bond 200 J/m², residual moisture content 7.5% | yes | 1.1 |
| Example e | Cardboard: Korsnaes Liquid FC, Scott bond 160 J/m², residual moisture content 7.5% | yes | 0.1 |
| Example f | Cardboard: Korsnaes Liquid FC, Scott bond 160 J/m², residual moisture content 7.5% | yes | 0.1 |
| Example g | Cardboard: Korsnaes Liquid FC, Scott bond 160 J/m², residual moisture content 7.5% | yes | 0.1 |
| Example h | Cardboard: Stora Enso Natura T Duplex double coating slip, Scott bond 200 J/m², residual moisture content 7.5% | yes | 1.1 |

TABLE 23

Details of the polymer interlayer in the further Comparative Examples a to j and the further Inventive Examples a to h

|  | L value | Proportion of LDPE 19N430 from Ineos GmbH, Cologne, Germany [% by wt.] | Proportion of Polyblak® PC 1423 from A. Schulman Inc. [% by wt.] | Proportion of Polywhite® PC 8163 from A. Schulman Inc. [% by wt.] |
|---|---|---|---|---|
| Comparative Example a | 90 | 100 | 0 | 0 |
| Comparative Example b | 90 | 100 | 0 | 0 |
| Comparative Example c | 90 | 100 | 0 | 0 |
| Comparative Example d | 90 | 100 | 0 | 0 |
| Comparative Example e | 28 | 93 | 5 | 2 |
| Comparative Example f | 58 | 44 | 1 | 55 |
| Comparative Example g | 90 | 100 | 0 | 0 |
| Comparative Example h | 90 | 100 | 0 | 0 |
| Comparative Example i | 28 | 93 | 5 | 2 |
| Comparative Example j | 58 | 44 | 1 | 55 |
| Example a | 30 | 67 | 5 | 28 |
| Example b | 44 | 71 | 4 | 25 |
| Example c | 56 | 66 | 4 | 30 |
| Example d | 44 | 71 | 4 | 25 |
| Example e | 30 | 67 | 5 | 28 |
| Example f | 44 | 71 | 4 | 25 |
| Example g | 56 | 66 | 4 | 30 |
| Example h | 44 | 71 | 4 | 25 |

TABLE 24

Evaluation of the studies for the further Comparative Examples a to j and the further Inventive Examples a to h

| | Metal content of the laminate | Microwave oven compatibility | Openability with drinking straw | Basis weight of the carrier layer [g/m$^2$] | Sensory analysis |
|---|---|---|---|---|---|
| Comparative Example a | − | − | no | 265 | 5.5 |
| Comparative Example b | − | − | yes | 265 | 5.5 |
| Comparative Example c | + | + | no | 265 | 5.5 |
| Comparative Example d | + | + | yes | 265 | 1.0 |
| Comparative Example e | + | + | yes | 265 | 2.3 |
| Comparative Example f | + | + | yes | 265 | 2.3 |
| Comparative Example g | ++ | ++ | no | 265 | 5.0 |
| Comparative Example h | ++ | ++ | yes | 265 | 1.1 |
| Comparative Example i | ++ | ++ | yes | 265 | 2.3 |
| Comparative Example j | ++ | ++ | yes | 265 | 2.0 |
| Example a | + | + | yes | 265 | 5.0 |
| Example b | + | + | yes | 265 | 5.5 |
| Example c | + | + | yes | 265 | 5.1 |
| Example d | + | + | yes | 210 | 5.4 |
| Example e | ++ | ++ | yes | 265 | 5.0 |
| Example f | ++ | ++ | yes | 265 | 5.5 |
| Example g | ++ | ++ | yes | 265 | 5.1 |
| Example h | ++ | ++ | yes | 210 | 5.4 |

It is apparent from Table 24 that it is possible in accordance with the invention to provide laminates from which low-metal containers can be manufactured, which can easily be opened with a drinking straw, are suitable for heating in a microwave oven and in which UHT milk can at the same time be stored with minimum impairment of taste. This combination of advantages was not achievable with any laminate from the comparative examples. Moreover, it is even possible in accordance with the invention to use laminates having a lower total basis weight without losing the aforementioned advantages. It is thus possible to produce containers having reduced transport weight. This is enabled since the addition of titanium dioxide and carbon black particles to a polymer layer (for example to the polymer interlayer) does not significantly increase the basis weight thereof, while a lighter carrier layer can be used without losing the aforementioned advantages. As tests have shown, the use of the lighter carrier layer in laminates that are otherwise identical to Comparative Examples c and g leads to distinctly increased impairment of the taste of the UHT milk according to sensory analysis. In laminates that otherwise correspond to Comparative Examples d to f and h to j, the result of the sensory analysis remains about the same or deteriorates a little more. By contrast, Examples d and h show that, in the laminates according to the invention, the lighter carrier layer can be used without losing the good shelf life of the milk.

Figure 2:
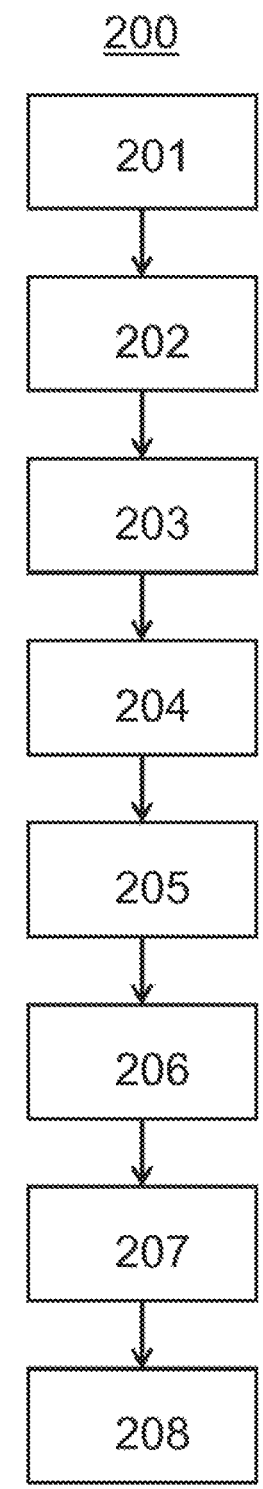
Figure 3:
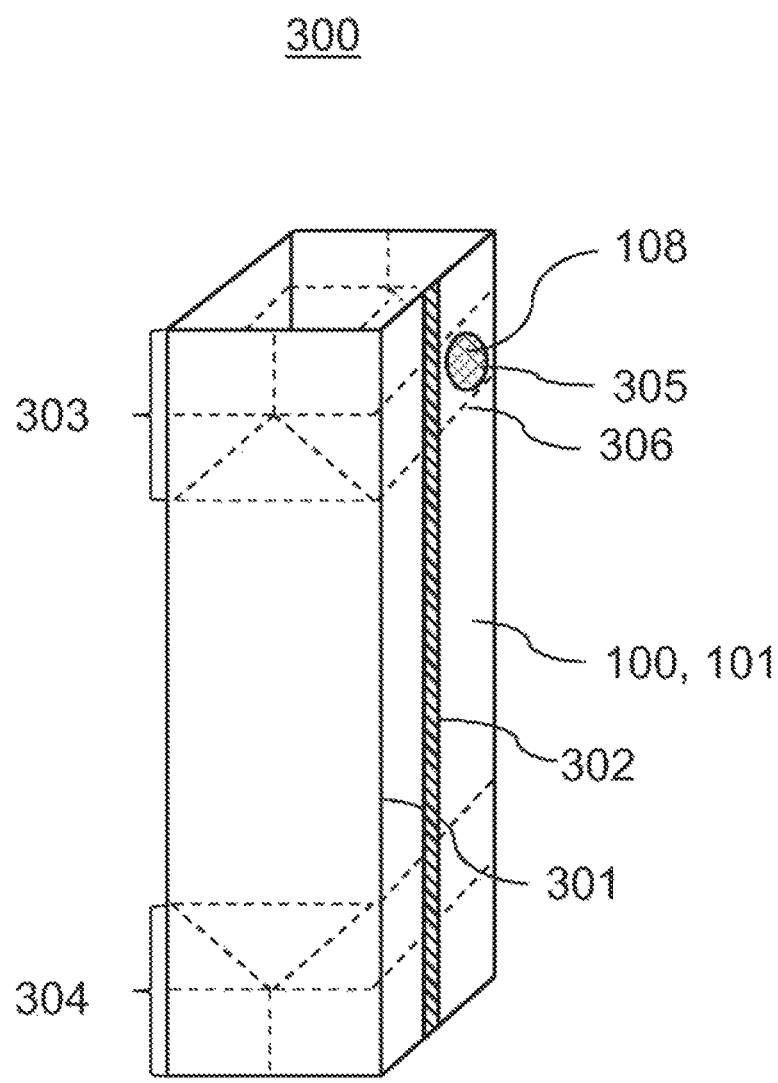
Figure 4:
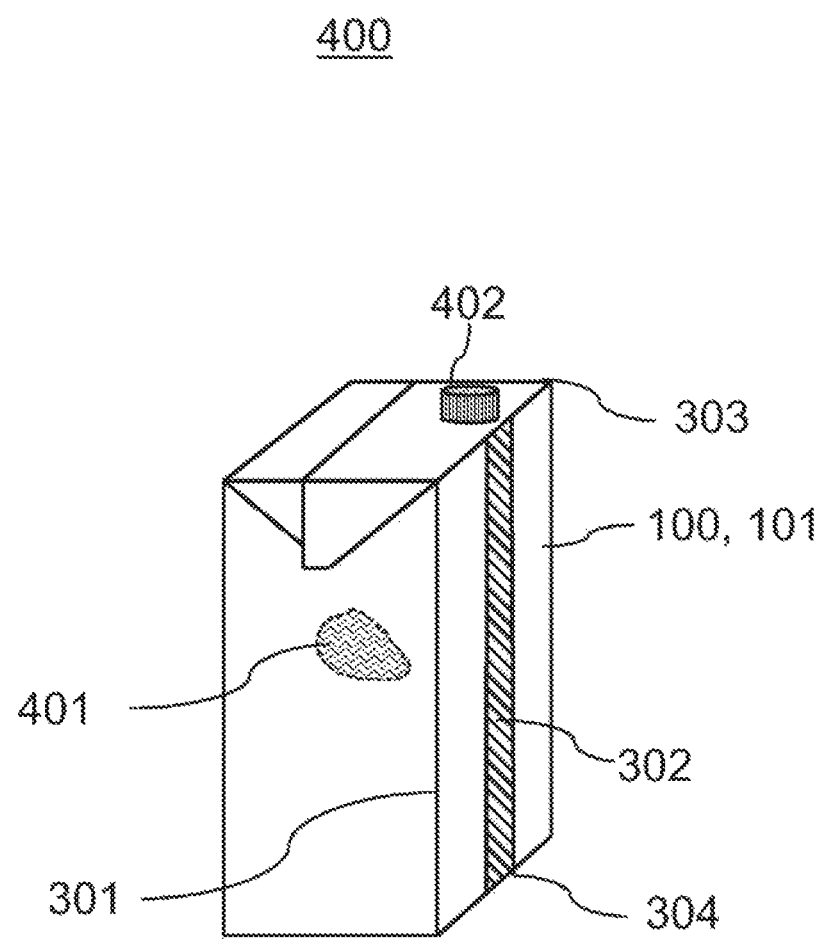

The figures respectively show, unless stated otherwise in the description or the respective figure, in schematic form and not to scale:

FIG. 1 a schematic diagram of a section of a sheetlike composite of the invention in cross section;

FIG. 2 a flow diagram of a method according to the invention for producing a sheetlike composite;

FIG. 3 a schematic diagram of a container precursor according to the invention;

FIG. 4 a schematic diagram of a closed container according to the invention;

FIG. 5 a flow diagram of a method according to the invention for producing a container precursor; and FIG. 6 a flow diagram of a method according to the invention for producing a closed container.

FIG. 1 shows a schematic diagram of a section of a sheetlike composite 100 according to the invention in cross section. The sheetlike composite 100 consists of the following layers in a layer sequence in a direction from an outer face 101 of the sheetlike composite 100 to an inner face 102 of the sheetlike composite 100: a colour application 103 which is a decoration of the sheetlike composite 100, an outer polymer layer 104, a carrier layer 105, a polymer interlayer 106, a first adhesion promoter layer 107, a barrier layer 108, a further adhesion promoter layer 112 and an inner polymer layer 113. The outer polymer layer 104 consists of LDPE 19N430 from Ineos GmbH, Cologne. The carrier layer 105 is a cardboard layer identified as Stora Enso Natura T Duplex with double coating slip (Scott bond 200 J/m$^2$, residual moisture content 7.5%). The first adhesion promoter layer 107 and the further adhesion promoter layer 112 each consist of a maleic anhydride-grafted ethylene-acrylate copolymer identified as Dow XZ89893 from The Dow Chemical Company AG. The barrier layer 108 is a barrier film identified as GL-AE■ C-FD from Toppan Printing Co. Ltd. This barrier film consists of a barrier substrate layer 109 composed of biaxially oriented PET (BOPET), an adjoining barrier material layer 110 of AlOx and an adjoining protective layer 111. In this case, in the sheetlike composite 100, the BOPET layer of the barrier film faces the outer face 101 of the sheetlike composite 100.

The barrier layer 108 has a thickness of 12 μm. The inner polymer layer 113 consists, in a direction from the barrier layer 108 to the inner face 102, of the following three sublayers: a first inner layer 114 composed of 75% by weight of HDPE and 25% by weight of LDPE, based in each case on the total weight of the first inner layer 114, a second inner layer 115 composed of 100% by weight of LDPE, based on the total weight of the second inner layer 115, and a third inner layer 116 composed of a polymer blend, where the polymer blend consists to an extent of 30% by weight of an mPE and to an extent of 70% by weight of an LDPE, based in each case on the total weight of the third inner layer 116. The polymer interlayer 106 consists of 15% by weight of $TiO_2$ particles, 1.2% by weight of carbon black particles and 83.8% by weight of LDPE 19N430 from Ineos GmbH, Cologne, Germany, based in each case on the weight of the polymer interlayer 106. The basis weight of the polymer interlayer 106 is 18 g/m$^2$. The polymer interlayer 106, by the test method described herein, has an L value in the L*a*b* colour space of 44.

FIG. 2 shows a flow diagram of a method 200 according to the invention for production of a sheetlike composite 100. The method 200 includes a method step a) 201 in which a sheetlike composite precursor consisting of a carrier layer 105 is provided. The carrier layer 105 is a cardboard layer identified as Stora Enso Natura T Duplex with double coating slip (Scott bond 200 J/m$^2$, residual moisture content 7.5%). Further, in method step a) 201, a polymer composition is provided. This consists of 15% by weight of $TiO_2$ particles, 1.2% by weight of carbon black particles and 83.8% by weight of LDPE 19N430 from Ineos GmbH, Cologne, Germany, based in each case on the weight of the polymer composition. In a method step b) 202, the carrier layer 105 is coated with the polymer composition by a layer extrusion method. This affords an outer polymer layer 104 overlaying the carrier layer 105 from the polymer composition. This outer polymer layer 104 has an L value in the L*a*b* colour space of 44. Downstream of method step b) 202, a barrier layer 108 is provided. The barrier layer 108 is a barrier film identified as GL-AE■ C-FD from Toppan Printing Co. Ltd. This barrier film consists of a barrier substrate layer 109 composed of biaxially oriented PET (BOPET), an adjoining barrier material layer 110 of AlOx and an adjoining protective layer 111. The barrier layer 108 is subjected on both sides to a surface treatment 203 in the form of a plasma treatment. This increases a surface tension of the barrier layer 108 both on the side of the barrier substrate layer 109 and on the side of the protective layer 111 to 55·10$^{-3}$ N/m. In an immediately subsequent method step c) 204, the barrier layer 108 is overlaid onto the carrier layer 105 with the barrier substrate layer 109 facing the carrier layer 105. This involves applying the barrier layer 108 on the opposite side of the carrier layer 105 from the outer polymer layer 104 by lamination. This involves introducing a polymer interlayer 106 of LDPE and a first adhesion promoter layer 107 as lamination layers between the carrier layer 105 and the barrier layer 106 proceeding from the carrier layer 105 in the direction of the barrier layer 108. In a method step d) 205, the barrier layer 108 is overlaid on a side remote from the carrier layer 105 with a further adhesion promoter layer 111 and an inner polymer layer 113. This involves applying the further adhesion promoter layer 111 and a first inner layer 114 and a second inner layer 115, which together form the inner polymer layer 113, by coextrusion. The first inner layer 114 consists of LDPE 19N430 from Ineos GmbH, Cologne, Germany, and the second inner layer 115 of a blend of 65% by weight of LDPE 19N430 from Ineos GmbH, Cologne, Germany and 35% by weight of Eltex 1315 AZ from Ineos GmbH, Cologne, Germany. Downstream of method step d) 205, the sheetlike composite 100 obtained above is printed with a decoration (reference numeral 206) on the side of the outer polymer layer 104. In a method step e) 207, grooves 306 are introduced into the sheetlike composite 100, such that, by folding along these grooves 306 and joining of particular regions of the folded sheetlike composite 100, containers can be formed from the sheetlike composite 100. For this purpose, a grooving tool acts mechanically on the sheetlike composite 100 and produces linear depressions in the carrier layer 105, called grooves 306. Downstream of method step e) 207, the grooved sheetlike composite 100 is cut to size to form a multitude of blanks, each for production of a single closed container 400 (reference numeral 208). These blanks can be processed further by the method 500 of the invention to form container precursors 300 in shell form.

FIG. 3 shows a schematic diagram of a container precursor 300 according to the invention. The container precursor 300 includes a blank of the sheetlike composite 100 obtained by the method 200 with 4 longitudinal folds 301, each of which forms a longitudinal edge 301. In the container precursor 300, the outer face 101 of the sheetlike composite 100 faces outward. The container precursor 300 is in the form of a shell and comprises a longitudinal seam 302 in which a first longitudinal edge and a further longitudinal edge of the sheetlike composite 100 are sealed to one another. In addition, the container precursor 300 comprises a hole 305 in the carrier layer 105. The hole 305 is covered by the outer polymer layer 104 (not shown), the polymer interlayer 106 (not shown), the first adhesion promoter layer 107 (not shown), the barrier layer 108, the further adhesion promoter layer 1112 (not shown) and the inner polymer layer 113 (not shown) as hole-covering layers. By folding along grooves 306 and joining of fold regions in a top region 303 and a base region 304 of the container precursor 300, a closed container 400 is obtainable. Such a closed container 400 is shown in FIG. 4.

FIG. 4 shows a schematic representation of a closed container 400 according to the invention. The closed container 400 has been produced from the container precursor 300 according to FIG. 3. The closed container 400 comprises a food or drink product 401 and has 12 edges. In addition, the closed container 400 is connected to a lid comprising an opening aid 402 which covers the hole 305 on the outer face 101 of the sheetlike composite 100. Here, the lid 402 comprises a cutting tool as opening aid in its interior.

FIG. 5 shows a flow diagram of a method 500 according to the invention for producing a container precursor 300. In a method step a. 501, a blank of the sheetlike composite 100 obtained as described above by the method 200 is provided. This comprises a first longitudinal edge and a further longitudinal edge. In a method step b. 502, the blank is folded. In a method step c. 503, the first longitudinal edge and the further longitudinal edge are pressed against one another and joined to one another by heat-sealing. Thus, a longitudinal seam 302 is obtained. According to the above description, the container precursor 300 according to FIG. 3 is produced.

FIG. 6 shows a flow diagram of a method 600 according to the invention for producing a closed container 400. In a method step A. 601, the container precursor 300 according to FIG. 3 is provided. In a method step B. 602, a base region 304 of the container precursor 300 is formed by folding the sheetlike composite 100. In a method step C. 603, the base region 304 is closed by sealing with hot air at a temperature of 300° C. In a method step D. 604, the container precursor 300 is filled with a food or drink product 401 and, in a method step E. 605, the container precursor 300 is closed by sealing in a top region 303, thereby obtaining the closed container 400 of FIG. 4. In a method step F. 606, the closed container 400 is joined to an opening aid 402.

LIST OF REFERENCE SIGNS

100 Sheetlike composite according to the invention
101 Outer face
102 Inner face
103 Colour application
104 Outer polymer layer
105 Carrier layer
106 Polymer interlayer
107 First adhesion promoter layer
108 Barrier layer
109 Barrier substrate layer
110 Barrier material layer
111 Protective layer
112 Further adhesion promoter layer
113 Inner polymer layer
114 First inner layer
115 Second inner layer
116 Third inner layer
200 method according to the invention for production of a sheetlike composite
201 Method step a)
202 Method step b)
203 Surface treatment
204 Method step c)
205 Method step d)
206 Printing
207 Method step e)
208 Cutting-to-size
300 Container precursor according to the invention
301 Longitudinal fold/longitudinal edge
302 Longitudinal seam
303 Top region
304 Base region
305 Hole
306 Groove
400 Closed container according to the invention
401 Food or drink product
402 Lid with opening aid
500 Method according to the invention for producing a container precursor
501 Method step a.
502 Method step b.
503 Method step c.
600 Method according to the invention for producing a closed container
601 Method step A.
602 Method step B.
603 Method step C.
604 Method step D.
605 Method step E.
606 Method step F.

The invention claimed is:

1. A sheetlike composite comprising, as mutually superposed layers, in a direction from an outer face of the sheetlike composite to an inner face of the sheetlike composite,
   a) a carrier layer, which comprises one selected from the group consisting of cardboard, paperboard and paper, or a combination of at least two of these, and
   b) a barrier layer;
   wherein, between the carrier layer and the barrier layer, the sheetlike composite consists of a polymer layer P and an adhesion promoter layer;
   wherein the polymer layer P includes a first polymer and has an L value in the L*a*b* colour space within a range from 30 to 56;
   wherein the polymer layer P comprises a polymer composition including the first polymer, titanium oxide particles in a proportion within a range from 14% to 18% by weight, and carbon black particles in a proportion within a range from 1.1% to 2.0% by weight, wherein the percentages by weight are each based on the weight of the polymer composition; and
   wherein the sheetlike composite is used for production of a food or drink product container.

2. The sheetlike composite according to claim 1, wherein the carrier layer has a transmittance of at least 0.4% for light within a wavelength range from 475 to 480 nm.

3. The sheetlike composite according to claim 1, wherein the carrier layer has at least one hole,
   wherein the at least one hole has been covered at least by the polymer layer P as hole-covering layer.

4. The sheetlike composite according to claim 1, wherein the barrier layer includes, as mutually superposed sublayers,
   a. a barrier substrate layer, and
   b. a barrier material layer;
   wherein the barrier material layer has an average thickness within a range from 1 nm to 1 µm.

5. The sheetlike composite of claim 1, wherein the polymer composition includes the carbon black particles in a proportion within a range from 1.1% to 1.8% by weight, wherein the percentages by weight are each based on the weight of the polymer composition.

6. The sheetlike composite of claim 1, wherein the polymer composition includes the titanium oxide particles in a proportion within a range from 14% to 16% by weight, wherein the percentages by weight are each based on the weight of the polymer composition.

7. The sheetlike composite of claim 1, wherein the polymer layer P has an average thickness within a range from 10 to 40 µm, and
   wherein the carrier layer comprises cardboard with a basis weight within a range from 140 to 450 g/m².

8. The sheetlike composite of claim 1, wherein the barrier layer is an oxygen barrier layer.

9. The sheetlike composite of claim 1, wherein the barrier layer has an oxygen permeation rate within a range from 0.1 to 40 cm³/(m²·day·atm).

* * * * *